US012723742B1

(12) United States Patent
Farzan

(10) Patent No.: US 12,723,742 B1
(45) Date of Patent: Sep. 1, 2026

(54) RECESSED LIGHTING FIXTURE WITH DRIVER PLATE

(71) Applicant: Nora Lighting, Inc., Commerce, CA (US)

(72) Inventor: Fred Farzan, Beverly Hills, CA (US)

(73) Assignee: Nora Lighting, Inc., Commerce, CA (US)

(*) Notice: Subject to any disclaimer, the term of this patent is extended or adjusted under 35 U.S.C. 154(b) by 0 days.

(21) Appl. No.: 19/443,604

(22) Filed: Jan. 8, 2026

(51) Int. Cl.

| | |
|---|---|
| ***F21V 19/00*** | (2006.01) |
| ***F21S 8/02*** | (2006.01) |
| ***F21V 7/00*** | (2006.01) |
| ***F21V 23/00*** | (2015.01) |
| ***F21V 29/503*** | (2015.01) |
| *F21Y 115/10* | (2016.01) |

(52) U.S. Cl.
CPC .......... *F21V 19/0055* (2013.01); *F21S 8/026* (2013.01); *F21V 7/0058* (2013.01); *F21V 23/002* (2013.01); *F21V 23/008* (2013.01); *F21V 29/503* (2015.01); *F21Y 2115/10* (2016.08)

(58) Field of Classification Search
CPC .. F21V 19/0055; F21V 29/503; F21V 7/0058; F21V 23/002; F21V 23/008; F21V 21/04; F21V 21/00; F21V 19/00; F21V 19/003; F21V 19/0015; F21V 29/502; F21S 8/026; F21Y 2115/10
See application file for complete search history.

(56) References Cited

U.S. PATENT DOCUMENTS

| | | | |
|---|---|---|---|
| 4,459,648 A | 7/1984 | Ullman | |
| 8,220,970 B1 | 7/2012 | Khazi et al. | |
| 8,322,897 B2 * | 12/2012 | Blincoe | F21V 29/75 362/373 |
| 8,408,759 B1 | 4/2013 | Rashidi | |
| 9,605,812 B2 | 3/2017 | Van De Ven et al. | |
| 9,857,038 B2 | 1/2018 | Coakley et al. | |
| 10,344,926 B2 | 7/2019 | Moon et al. | |
| 10,914,465 B2 | 2/2021 | Cohen | |
| 11,092,326 B2 | 8/2021 | Cohen | |
| D935,082 S | 11/2021 | Cohen | |
| 2017/0051880 A1 | 2/2017 | Joye et al. | |
| 2019/0242552 A1 | 8/2019 | Liu | |
| 2023/0107356 A1 * | 4/2023 | Wedekind | F21V 21/049 362/404 |

FOREIGN PATENT DOCUMENTS

| | | |
|---|---|---|
| CN | 201983012 U | 9/2011 |
| KR | 2008-0000034 | 1/2008 |
| KR | 2011-0048927 | 5/2011 |

OTHER PUBLICATIONS

Lei Han and Nadarajah Narendran, Developing an Accelerated Life Test Method for LED Drivers, Ninth International Conference on Solid State Lighting (2009).

* cited by examiner

*Primary Examiner* — Bao Q Truong
(74) *Attorney, Agent, or Firm* — K&L Gates LLP

(57) ABSTRACT

A recessed lighting fixture apparatus is disclosed. An example apparatus includes a driver housing and a driver plate configured to receive first fasteners for coupling the driver housing to the driver plate. The example apparatus further includes a heat sink module configured to receive second fasteners for coupling the driver plate to the heat sink module. The example apparatus includes an LED module, an LED module holder, and a reflector received in a cavity extending from a lower surface of the heat sink module.

20 Claims, 23 Drawing Sheets

RECESSED LIGHTING FIXTURE WITH DRIVER PLATE

BACKGROUND

Walk into any room or store, and there is one thing that most people will take for granted, the lighting. As long as the lighting is sufficient and not distracting, people direct their attention to elements in the room or products on display. However, this quickly changes (for the worse) if there is an inoperative light fixture, a flickering light, a light that emits a high-pitched tone, and/or a light that appears overly bright or dim given the environment. In essence, most lighting is an understated decorative component that is to perform its function as intended while not drawing (significant) attention to itself.

Manufacturers of lighting products, including recessed lighting products, adhere to customer desires by creating lighting products that are generally aesthetically pleasing, cost-efficient, and conform to building/electrical codes. To satisfy different customer tastes and decorative styles, manufacturers devote most of their effort creating different lighting designs and features. This includes providing different shaped and colored lighting trim and/or cups, different types of lighting (e.g., track lighting, recessed lighting, pendant lighting, etc.), and different types of illumination (e.g., incandescent, compact fluorescent, light-emitting diode ("LED"), etc.).

The vast majority of recessed lighting products in homes and commercial spaces today include a socket configured to receive a bulb such as an incandescent bulk, a compact fluorescent bulb, or an LED bulb. However, consumer preference is shifting primarily toward the use of LED due to their energy-efficiency and long lifespan resulting in energy and cost savings. In this vein, integrated LED light fixtures with LED chips and arrays built directly into the fixture are additionally gaining popularity because integrated heat dissipation leads to even longer lifetimes than the use of LED bulbs. Thus, there is a need to provide recessed lighting fixtures with integrated LED light fixtures for retrofitting lighting products.

SUMMARY

The present disclosure provides a new and innovative recessed lighting fixture apparatus that enables easy installation of integrated LED light fixtures for retrofit, remodel, or new construction applications. The example recessed lighting fixture includes a driver housing configured to contain a driver, which provides power to an LED module. The driver housing is removably coupled to a driver plate which is, in turn, removably coupled to a heat sink module. The disclosed configuration allows for straightforward assembly of the recessed lighting fixture using common fasteners such as machine screws. Further, the removable nature of the coupling of the driver housing to the heat sink module via the driver plate allows for easy access to the contents of the driver housing (e.g., the driver) for service and maintenance or retrofit needs.

The heat sink module includes a cavity extending from a lower surface that is configured to receive an LED module, an LED module holder, and a reflector. The LED module may be directly coupled to the heat sink module (e.g., via thermal paste). The LED module holder may be coupled to the heat sink module using fasteners and may be configured to hold the LED module in place relative to the heat sink module. Accordingly, the heat sink module may effectively dissipate heat generated by the LED module, thus reducing the heat and increasing the lifespan of the LED module.

Additionally, the heat sink module may be substantially cylindrical with a plurality of fins around its circumference. At least a lower portion of the outer surface of the heat sink module may have external threads which allow coupling of the heat sink module to a trim piece. This threaded connectivity allows for easy customization of the trim piece included with the recessed lighting fixture. The reflector may be non-fixedly coupled to the heat sink module between the LED module holder and the trim piece. Thus, the configuration of the recessed lighting fixture disclosed herein further allows for easy replacement of the reflector.

Aspects of the subject matter described herein may be useful alone or in combination with one or more other aspect described herein. Without limiting the foregoing description, in a first aspect of the present disclosure, a recessed lighting fixture apparatus is disclosed. The recessed lighting fixture apparatus includes a driver housing. The driver housing includes a hollow cavity configured to receive a driver and two or more first apertures configured to receive first fasteners for coupling the driver housing to a driver plate. The recessed lighting fixture apparatus further includes the driver plate including a top surface and a bottom surface. The top surface of the driver plate includes two or more second apertures configured to receive the first fasteners. The bottom surface of the driver plate includes two or more third apertures configured to receive second fasteners for coupling the driver plate to a heat sink module. The recessed lighting fixture apparatus further includes the heat sink module. The heat sink module includes two or more fourth apertures configured to receive the second fasteners, a lower portion of the heat sink module including external threads for coupling with a trim piece and a cavity extending from a lower surface of the heat sink module. The cavity of the heat sink module is configured to receive an LED module, an LED module holder, and a reflector. The recessed lighting fixture apparatus further includes the LED module configured to emit light, the LED module holder configured to maintain a relative position of the heat sink module and the LED module, and the reflector configured to reflect at least a portion of the light emitted by the LED module.

In accordance with a second aspect of the present disclosure, which may be used in combination with the first aspect, the top surface of the driver plate is configured to mate with a bottom surface of the driver housing when the recessed lighting fixture apparatus is in an assembled configuration.

In accordance with a third aspect of the present disclosure, which may be used in combination with any other aspect disclosed herein, the LED module is configured to mate with an inner top surface of the cavity of the heat sink module.

In accordance with a fourth aspect of the present disclosure, which may be used in combination with any other aspect disclosed herein, the LED module holder includes one or more fifth apertures configured to receive third fasteners for coupling with the cavity of the heat sink module.

In accordance with a fifth aspect of the present disclosure, which may be used in combination with any other aspect disclosed herein, the cavity of the heat sink module includes one or more sixth apertures configured to receive the third fasteners for coupling the LED module holder to the heat sink module.

In accordance with a sixth aspect of the present disclosure, which may be used in combination with any other aspect disclosed herein, the heat sink module further includes a notched area extending from a top surface of the heat sink module, the notched area configured to allow passage of one or more wires.

In accordance with a seventh aspect of the present disclosure, which may be used in combination with any other aspect disclosed herein, the two or more second apertures include internal threads.

In accordance with an eighth aspect of the present disclosure, which may be used in combination with any other aspect disclosed herein, the two or more fourth apertures include internal threads.

In accordance with a ninth aspect of the present disclosure, which may be used in combination with any other aspect disclosed herein, the two or more fourth apertures extend from a top surface of the heat sink module.

In accordance with a tenth aspect of the present disclosure, which may be used in combination with any other aspect disclosed herein, the bottom surface of the driver plate is configured to mate with the top surface of the heat sink module.

In accordance with an eleventh aspect of the present disclosure, which may be used in combination with any other aspect disclosed herein, the two or more fourth apertures extend from a recessed surface of the heat sink module.

In accordance with a twelfth aspect of the present disclosure, which may be used in combination with any other aspect disclosed herein, the bottom surface of the driver plate is configured to mate with the recessed surface of the heat sink module.

In accordance with a thirteenth aspect of the present disclosure, which may be used in combination with any other aspect disclosed herein, a driver plate of a recessed lighting fixture is disclosed. The driver plate includes an outer ring portion having an outer diameter and an inner diameter, the outer ring portion including two or more first apertures configured to receive first fasteners for coupling the driver plate to a driver housing of the recessed lighting fixture. The driver plate further includes two or more protrusions extending inward from the inner diameter of the outer ring portion, an inner portion of each of the two or more protrusions including a second aperture configured to receive second fasteners for coupling the driver plate to a heat sink module of the recessed lighting fixture, a bottom surface of the two or more protrusions extending below a lower surface of the outer ring portion.

In accordance with a fourteenth aspect of the present disclosure, which may be used in combination with any other aspect disclosed herein, each of the two or more first apertures include internal threads.

In accordance with a fifteenth aspect of the present disclosure, which may be used in combination with any other aspect disclosed herein, each of the second apertures are unthreaded apertures.

In accordance with a sixteenth aspect of the present disclosure, which may be used in combination with any other aspect disclosed herein, the bottom surface of the two or more protrusions is configured to mate with a recessed surface of the heat sink module and the lower surface of the outer ring portion is configured to mate with a top surface of the heat sink module when the recessed lighting fixture is in an assembled configuration.

In accordance with a seventeenth aspect of the present disclosure, which may be used in combination with any other aspect disclosed herein, a driver plate of a recessed lighting fixture is disclosed. The driver plate includes an upper disc portion having an outer diameter and a lower ring portion extending from a lower surface of the upper disc portion, the lower ring portion extending radially inward from at least a portion of the outer diameter to an inner diameter. The driver plate further includes two or more first apertures extending through the upper disc portion and the lower ring portion, the two or more first apertures configured to receive first fasteners for coupling the driver plate to a driver housing of the recessed lighting fixture and two or more second apertures extending through the upper disc portion and the lower ring portion, the two or more second apertures configured to receive second fasteners for coupling the driver plate to a heat sink module of the recessed lighting fixture, a bottom surface of the lower ring portion configured to mate with a top surface of the heat sink module when the recessed lighting fixture is in an assembled configuration.

In accordance with an eighteenth aspect of the present disclosure, which may be used in combination with any other aspect disclosed herein, each of the two or more first apertures include internal threads.

In accordance with a nineteenth aspect of the present disclosure, which may be used in combination with any other aspect disclosed herein, each of the two or more second apertures are unthreaded apertures.

In accordance with a twentieth aspect of the present disclosure, which may be used in combination with any other aspect disclosed herein, each of the two or more second apertures are counterbored apertures.

In accordance with a twenty-first aspect of the present disclosure, any of the structure and functionality illustrated and described in connection with FIGS. 1 to 25 may be used in combination with any of the structure and functionality illustrated and described in connection with any of the other of FIGS. 1 to 25 and with any one or more of the preceding aspects.

In light of the present disclosure and the above aspects, it is therefore an advantage of the present disclosure to provide for easy installation of integrated LED light fixtures for retrofit, remodel or new construction applications.

It is another advantage of the present disclosure to provide mechanical coupling between a driver housing and a heat sink module of an LED light fixture using a modular driver plate.

It is a further advantage of the present disclosure to allows for easy access to the contents of the driver housing (e.g., the LED driver) for service and maintenance.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Figure 1:
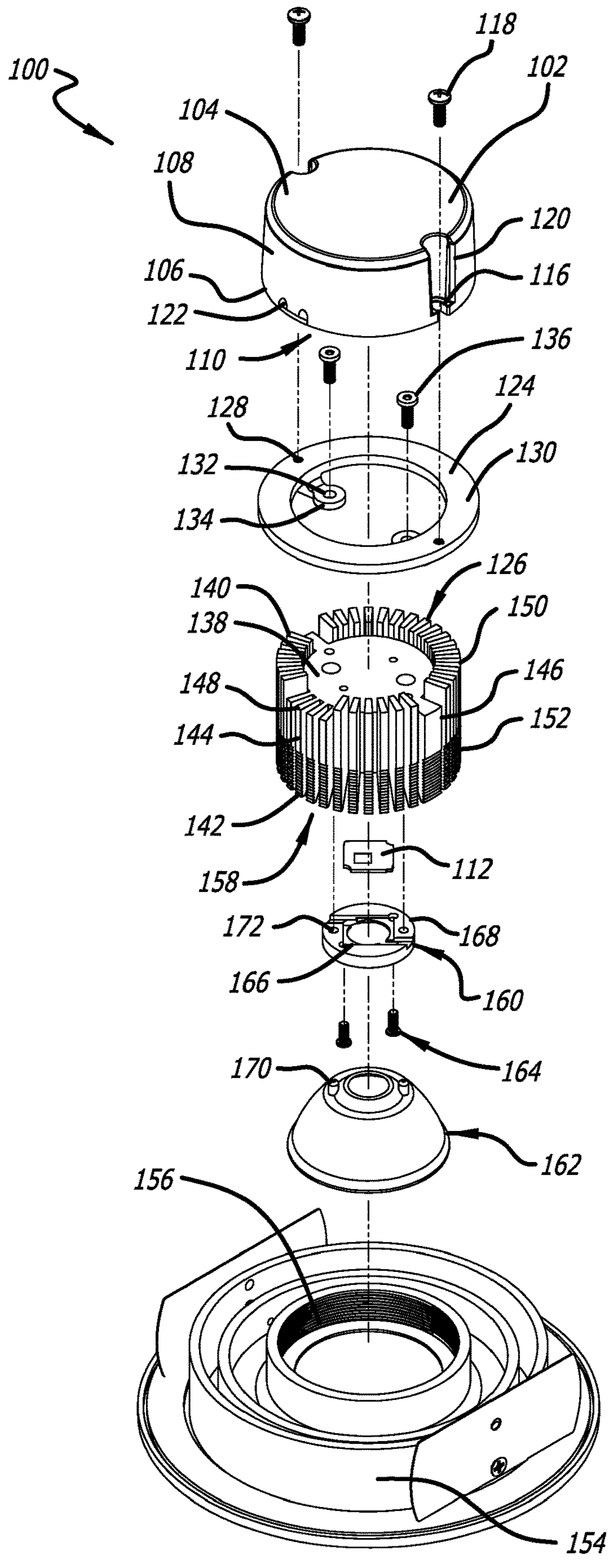
FIG. 1 shows a diagram of a perspective view of a recessed lighting fixture, according to an example embodiment of the present disclosure.

The present disclosure relates in general to a recessed lighting fixture and in particular, to a recessed lighting fixture with modular assembly allowing for ease of service and customization. The example recessed lighting fixture disclosed herein includes a driver housing. The driver housing is configured to hold a driver that provides power to an LED module. The LED module is coupled to a heat sink module that dissipates heat generated by the LED module during operation. The heat sink module is coupled to the driver housing via a driver plate. A first set of fasteners couples the heat sink module and the driver plate while a second set of fasteners couples the driver plate and the driver housing. The LED module is held in place by an LED module holder, which is fixedly attached to the heat sink module in an inner cavity of the heat sink module. The recessed lighting fixture disclosed herein further includes a reflector to reflect at least a portion of the light emitted by the LED module. A trim piece may be attached to the heat sink module via external threading on the heat sink module to provide an aesthetic outer appearance of the recessed lighting fixture.

The present disclosure provides a new and innovative recessed lighting fixture apparatus that provides for easy installation of integrated LED light fixtures for retrofit, remodel, or new construction applications. The example recessed lighting fixture includes a driver housing configured to contain a driver that provides power to an LED module. The driver housing is removably coupled to a driver plate which is, in turn, removably coupled to a heat sink module. The disclosed configuration allows for straightforward assembly of the recessed lighting fixture using common fasteners such as machine screws. Further, the removable nature of the coupling of the driver housing to the heat sink module via the driver plate allows for easy access to the contents of the driver housing (e.g., the driver) for service and maintenance or retrofit needs.

The heat sink module includes a cavity extending from a lower surface that is configured to receive an LED module, an LED module holder, and a reflector. The LED module may be directly coupled to the heat sink module (e.g., via thermal paste). The LED module holder may be coupled to the heat sink module using fasteners and may be configured to hold the LED module in place relative to the heat sink module. Accordingly, the heat sink module may effectively dissipate heat generated by the LED module, thus reducing the heat and increasing the lifespan of the LED module.

Additionally, the heat sink module may be substantially cylindrical with a plurality of fins around its circumference. At least a lower portion of the outer surface of the heat sink module may have external threads which allow coupling of the heat sink module to a trim piece. This threaded connectivity allows for easy customization of the trim piece included with the recessed lighting fixture. The reflector may be non-fixedly coupled to the heat sink module between the LED module holder and the trim piece. Thus, the configuration of the recessed lighting fixture disclosed herein further allows for easy replacement of the reflector.

While the following disclosure discusses the installation of a recessed lighting fixture relative to a ceiling, it should be appreciated that the recessed lighting fixture may be installed behind a wall or under a floor. Generally, driver, driver plate, and heat sink portions of the recessed lighting fixture are meant to be hidden from view while the LED module, module holder, reflector, and trim piece are viewable when installed. Further, while the components of the recessed lighting fixture are shown as being constructed from respective materials, it should be appreciated that either or all of the components may include another material, such as plastic, a carbon-fiber composite, a wood compound, and/or combinations thereof.

Further, while the following disclosure references recessed lighting fixtures, it should be appreciated that the recessed lighting fixture disclosed herein may be used for other types of lighting, such as track lighting, pendant lighting, rail lighting, cylinder lighting, panel lighting, or sconce lighting. In these other examples, the recessed lighting fixture is configured to provide an integrated LED light source for different lighting types.

Recessed Lighting Fixture First Embodiment

Figure 24B:
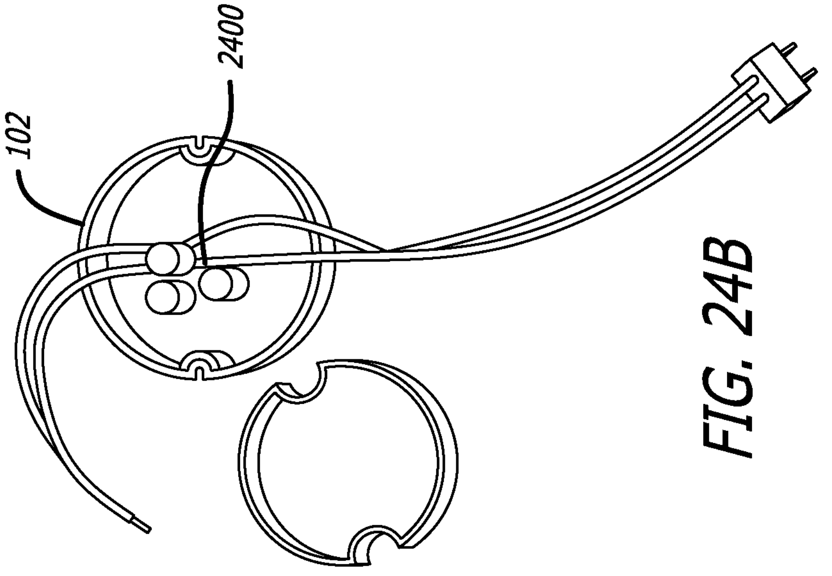
FIGS. 24A and 24B illustrate an example driver housing according to the first embodiment of the recessed lighting fixture in a top perspective view and a bottom perspective view, according to an example embodiment of the present disclosure.
Figure 24A:
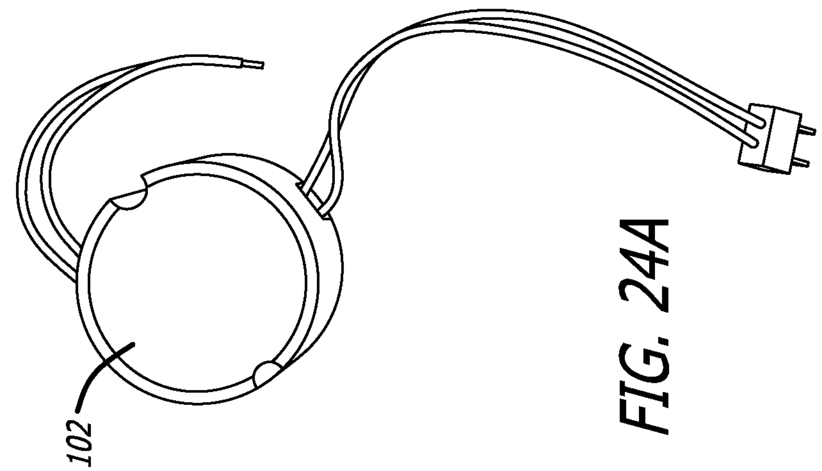

FIGS. 1 to 12 show a first embodiment of a recessed lighting fixture disclosed herein. FIG. 1 shows a diagram of a perspective view of a recessed lighting fixture 100, according to an example embodiment of the present disclosure. The example recessed lighting fixture 100 includes a driver housing 102. The example driver housing 102 is substantially cylindrical having a closed end 104 (e.g., top end, top surface) and an open end 106 (e.g., bottom end, bottom surface). The walls 108 of the driver housing 102 and the closed end 104 form a cavity 110 which is configured to hold an LED driver. The LED driver (not pictured) regulates the power supplied to an LED module 112 of the recessed lighting fixture 100. For example, the LED driver may convert AC input voltage delivered to the recessed lighting fixture 100 to low power DC voltage compatible with the LED module 112. The cavity 110 of the driver housing 102 may further house one or more wire harness assemblies configured to deliver power to the LED driver or from the LED driver to the LED module 112. While the driver housing 102 may be illustrated in FIGS. 1 to 12 with the internal components omitted, it should be understood that the recessed lighting fixture 100 includes a fully populated driver housing 102. For example, the driver housing 102 includes multiple electrical components that are secured and encapsulated using potting material. An example populated driver housing 102 is illustrated in FIGS. 24A-24B.

The bottom surface 106 of the driver housing 102 includes two or more first apertures 116 for receiving first fasteners 118. The example driver housing 102 further includes at least two notches 120 in the walls 108 and the closed end 104 which axially align with the two or more first apertures 116. Accordingly, the notches 120 provide an assembly path for installing the first fasteners 118 in the two or more first apertures 116. Additionally, the example driver housing 102 includes one or more openings 122 in the walls 108 which may provide for passage of the one or more wire harness assemblies into the cavity 110.

The example recessed lighting fixture 100 of FIG. 1 includes a driver plate 124. The example driver plate 124, discussed in further detail below in connection with FIGS. 5-7B, provides for mechanical coupling of the driver housing 102 and a heat sink module 126. The driver plate 124 may be formed from a high temperature compatible polymer material. For example, polymer material of the driver plate 124 may have a temperature rating of at least 120° C. in order to prevent distortion of the driver plate 124 during use of the recessed lighting fixture 100. In other embodiments, the driver plate 124 may be formed from a metallic, composite, or any other temperature compatible material.

Second apertures 128 on a top surface 130 of the driver plate 124 are configured to receive the first fasteners 118 to removably couple the driver plate 124 with the driver housing 102. When assembled, the top surface 130 of the driver plate 124 mates with the open end 106 of the driver housing 102. Additionally, the driver plate 124 includes third apertures 132 on a bottom surface 134 of the driver plate 124 configured to receive second fasteners 136 to removably couple the driver plate 124 with the heat sink module 126. When assembled, the bottom surface 134 of the driver plate 124 mates with a recessed surface 138 of the heat sink module 126. Accordingly, when assembled, the driver housing 102 is indirectly and removably coupled to the heat sink module 126 via the driver plate 124.

The example heat sink module 126, discussed in further detail below in connection with FIGS. 8-10, may be made from an extruded metal suitable for efficient heat dissipation such as aluminum. Additionally, one or more post-processes may be performed on the metal extrusion such as drilling, tapping, and turning to form the features disclosed herein. The example heat sink module 126 is substantially cylindrical extending from a top surface 140 to a bottom surface 142. The heat sink module 126 includes a plurality of spaced fins 144 radiating outward from an outer diameter of the recessed surface 138 to an outer diameter of the heat sink module 126. The fins 144 serve to increase the surface area of the heat sink module 126 to assist in heat dissipation.

A majority portion of the fins 144 are a first width and extend from the top surface 140 to the bottom surface 142 of the heat sink module 126. The example heat sink module further includes two or more wide fins 146 which extend from the recessed surface 138 to the bottom surface 142. Further, the example heat sink module 126 may include a notched portion 148 where the fins 144 extend from the recessed surface 138 to the bottom surface 142. The notched portion 148 may allow for passage of one or more wire harnesses between the LED module 112 and the driver housing 102.

Additionally, the example heat sink module 126 includes an upper portion 150 and a lower portion 152. The example lower portion 152 of the heat sink module 126 may include external threads to provide for attachment of a trim piece 154. For example, the trim piece 154 may include internal threads 156, which are compatible with the external threads of the lower portion 152. The disclosed configuration allows for easy installation of and removal of the trim piece 154 to support ease of installation of the recessed lighting fixture 100 and for simple customization of the recessed lighting fixture 100 by replacement of the trim piece 154. While the example recessed lighting fixture 100 of FIG. 1 is shown in connection with the trim piece 154, it should be understood that any suitable trim piece may be used which is compatible with the external threads of the heat sink module 126.

The example heat sink module 126 further includes a conical cavity 158 extending inward from the bottom surface 142. The conical cavity 158 may be a hollow cutout of the heat sink module 126 configured to hold the LED module 112, an LED module holder 160 and a reflector 162. The example LED module holder 160 is configured to removably couple to the heat sink module 126 via third fasteners 164 in order to maintain a relative position of the LED module 112 and the heat sink module 126. For example, the LED module holder 160 may include a chip cavity 166 which is shaped to receive the LED module 112. Accordingly, when a top surface 168 of the LED module holder 160 is mated with the heat sink module 126, relative movement of the LED module 112 and the heat sink module 126 is restricted.

The example reflector 162 is configured to reflect at least a portion of the light emitted by the LED module 112. In some embodiments, the reflector 162 may provide spot reflection where the light is directed to a focused illumination area. In other embodiments, the reflector 162, may provide flood reflection where the light is directed to a wide illumination area. In some embodiments, the reflector 162 may provide narrow flood reflection with the illumination area falling between the focused and wide illumination areas of the spot and flood reflectors. The example reflector 162 includes two or more pins 170 extending away from the reflection surface. The two or more pins 170 are configured to be received by two or more apertures 172 in the LED module holder 160. As such, the reflector 162 may be coupled with the LED module holder 160 to restrict axial and rotational movement of the reflector 162 by placement of the pins 170 in the apertures 172. Further, upon assembly of the trim piece 154 onto the heat sink module 126, longitudinal movement of the reflector 162 may further be restricted to fix the relative position of the reflector in the recessed lighting fixture 100.

Figure 2:
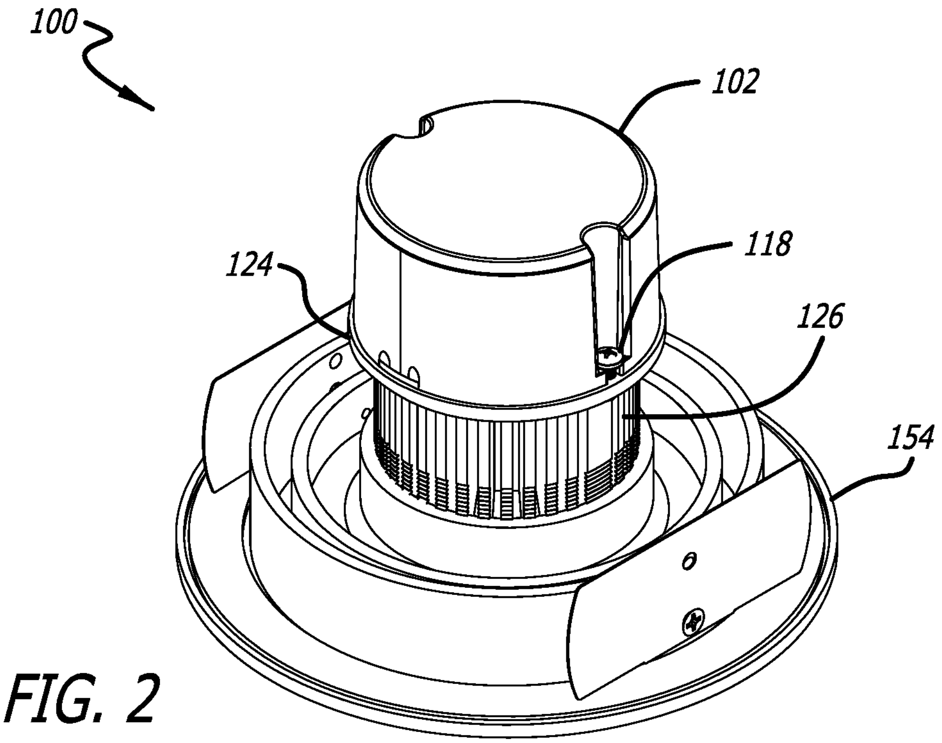
FIG. 2 shows a diagram of a perspective view of the recessed lighting fixture of FIG. 1 in an assembled configuration, according to an example embodiment of the present disclosure.
Figure 3:
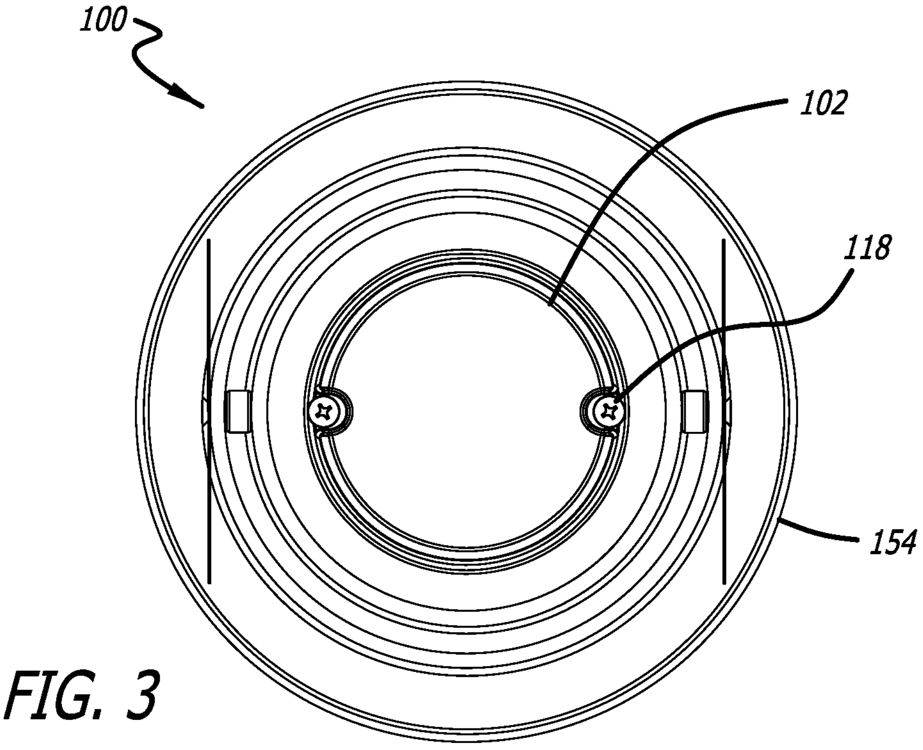
FIG. 3 shows a diagram of a top view of the recessed lighting fixture of FIG. 1, according to an example embodiment of the present disclosure.

FIGS. 2 and 3 show diagrams of a perspective view and a top view of the recessed lighting fixture 100 of FIG. 1 in an assembled configuration. The example driver housing 102 can be seen coupled to the driver plate 124 via the first fasteners 118. Below the driver plate 124 is the heat sink module 126 which is attached via the second fasteners (not shown). Additionally, the example trim piece 154 is shown coupled to the heat sink module 126 via the external threads of the heat sink module 126.

Figure 4:
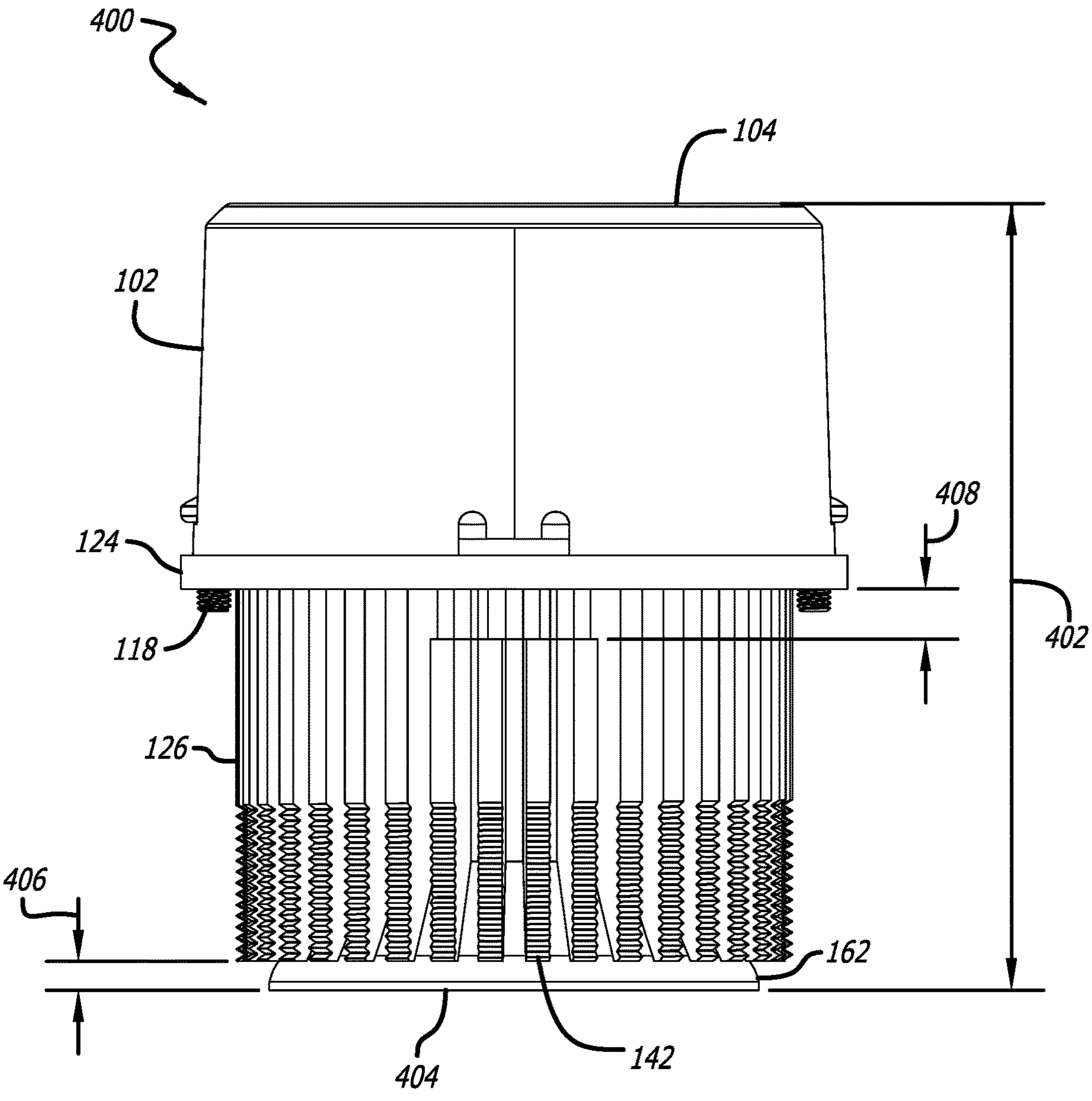
FIG. 4 shows a diagram of a side view of the recessed lighting fixture of FIG. 1 with the trim omitted, according to an example embodiment of the present disclosure.

FIG. 4 shows a diagram of a side view of a subassembly of the recessed lighting fixture 100 of FIG. 1. In the subassembly 400, the trim piece 154 omitted from the recessed lighting fixture 100. An overall height 402 of the subassembly is defined by a distance from the top surface 104 of the driver housing 102 to a bottom surface 404 of the reflector 162. In some embodiments, the overall height 402 may be from 40 to 100 mm, for example, 40 to 60 mm, 60 to 80 mm, or 80 to 100 mm. In a preferred embodiment, the overall height 402 is approximately 63 mm. In the disclosed embodiment, then fully assembled, the bottom surface 404 of the reflector 162 does not sit flush with the bottom surface 142 of the heat sink module 126. For example, the bottom surface 404 of the reflector 162 may extend a first distance 406 past the bottom surface 142 of the heat sink module 126. In some embodiments, the first distance 406 may be from 0 to 10 mm, for example, 0 to 2 mm, 2 to 4 mm, 4 to 6 mm, 6 to 8 mm, or 8 to 10 mm. In a preferred embodiment, the first distance 406 is approximately 2.6 mm. Further, FIG. 4 illustrates a height 408 of the notched portion 148. Accordingly, the height 408 represents a distance between the recessed surface 138 and the top surface 140 of the heat sink module 126. In some embodiments, the height 408 may be from 2 to 10 mm, for example, 2 to 4 mm, 4 to 6 mm, 6 to 8 mm, or 8 to 10 mm. In a preferred embodiment, the height 408 is approximately 4.6 mm.

Figure 5:
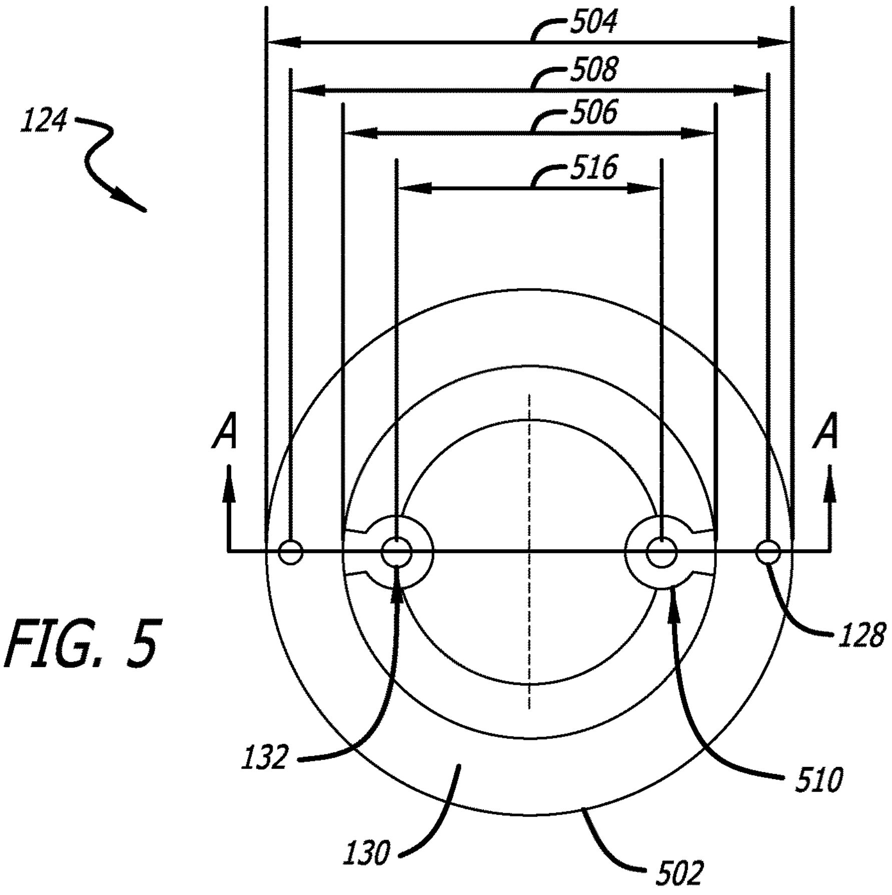
FIG. 5 shows a diagram of a top view of the driver plate of the recessed lighting fixture of FIG. 1, according to an example embodiment of the present disclosure.
Figure 6:
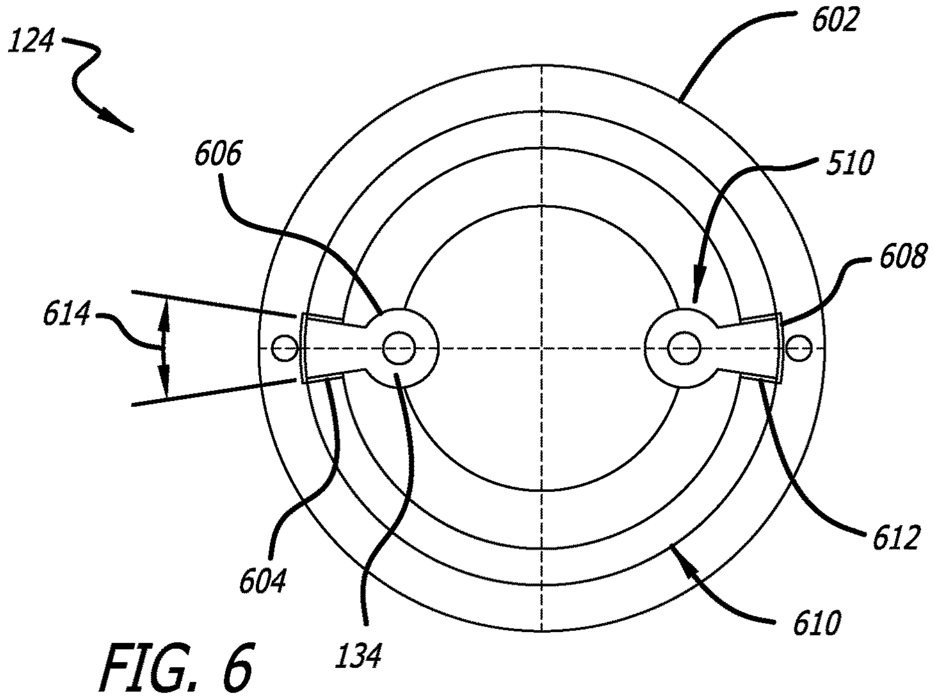
FIG. 6 shows a diagram of a bottom view of the driver plate of the recessed lighting fixture of FIG. 1, according to an example embodiment of the present disclosure.

FIGS. 5 and 6 show a top view and a bottom view of the driver plate 124 of the recessed lighting fixture 100 of FIG. 1. The example driver plate 124 includes an outer ring 502 extending from an outer diameter 504 of the driver plate 124 inward to an inner diameter 506. In some embodiments, the outer diameter 504 may be from 40 to 100 mm, for example, 40 to 60 mm, 60 to 80 mm, or 80 to 100 mm. In a preferred embodiment, the outer diameter 504 is approximately 60 mm. In some embodiments, the inner diameter 506 may be from 20 to 80 mm, for example, 20 to 40 mm, 40 to 60 mm, or 60 to 80 mm. In a preferred embodiment, the inner diameter 506 is approximately 42 mm. The second apertures 128 extend through the thickness of the outer ring 502 and are placed along a circle having a diameter 508 and being co-centric with the outer diameter 504 and the inner diameter 506. In some embodiments, the diameter 508 may be from 40 to 100 mm, for example, 40 to 60 mm, 60 to 80 mm, or 80 to 100 mm. In a preferred embodiment, the diameter 508 is approximately 54 mm. In the example of FIG. 5, the driver plate 124 includes two second apertures 128. In another embodiments, the driver plate 124 may include additional second apertures 128 located along the circle having the diameter 508.

The example second apertures 128 of FIG. 5 are fully threaded. Thus, the first fasteners 118 may be threaded fasteners which may be fed through the first apertures 116 (which may be threaded or unthreaded) of the driver housing 102 and joined to the driver plate 124 via threading into the second apertures 128. In other embodiments, the second apertures 128 may be threaded or unthreaded and a nut may be placed on the first fasteners 118 on the underside of the outer ring 502. Other means of mechanical fastening may be used to couple the driver housing 102 and the driver plate 124 via the first apertures 116 and the second apertures 128 such as rivets, welding, snap-fit fasteners, or any other suitable means.

The example driver plate 124 further includes a plurality of protrusions 510 extending inward from the inner diameter 506 of the outer ring 502. In addition to extending inward, the plurality of protrusions 510 may extend downward from a lower surface 602 of the outer ring, as shown in FIG. 6. Thus, a bottom surface of the protrusions 510 forms the bottom surface 134 of the driver plate 124. Each of the plurality of protrusions 510 include a tapered portion 604 and a round portion 606. A base 608 of the tapered portion 604 of each protrusion 510 is aligned with a circle 610 which is co-centric with the outer diameter 504. A diameter of the circle 610 may be less than the diameter 508 by at least, for example, the diameter of one of the second apertures 128 such that the plurality of protrusions 510 do not interfere with the second apertures 128. In some embodiments, the diameter of the circle 610 may be from 30 to 90 mm, for example, 30 to 50 mm, 50 to 70 mm, or 70 to 90 mm. In a preferred embodiment, the outer diameter 504 is approximately 50 mm. Each of the sides 612 of the tapered portion 604 extend inward in a direction approximately normal from the circle 610 and to a point inward of the inner diameter 506 of the outer ring 502. The two sides 612 of one of the protrusions 510 are positioned an angle 614 relative to one another. In some embodiments, the angle is approximately 15 degrees.

The round portion 606 of each of the protrusions extends inward from the tapered portion 604. In some embodiments, a diameter of the round portion 606 is approximately the same (e.g., within 5%, within 10%, within 20%, within 30%) as the arc length of the base 608 of the tapered portion. The third apertures 132 are located on the round portion 606 of the protrusions 510, approximately co-centric with the diameter of the round portion 606. Further, the example third apertures 132 are aligned with a circle having a diameter 516 and being co-centric with the outer diameter 504 and the inner diameter 506. In some embodiments, the diameter 516 may be from 15 to 75 mm, for example, 15 to 35 mm, 35 to 55 mm, or 55 to 75 mm. In a preferred embodiment, the diameter 516 is approximately 30 mm. In the example of FIGS. 5 and 6, the third apertures 132 are unthreaded apertures. In some embodiments, the third apertures 132 may be threaded.

Figure 7A:
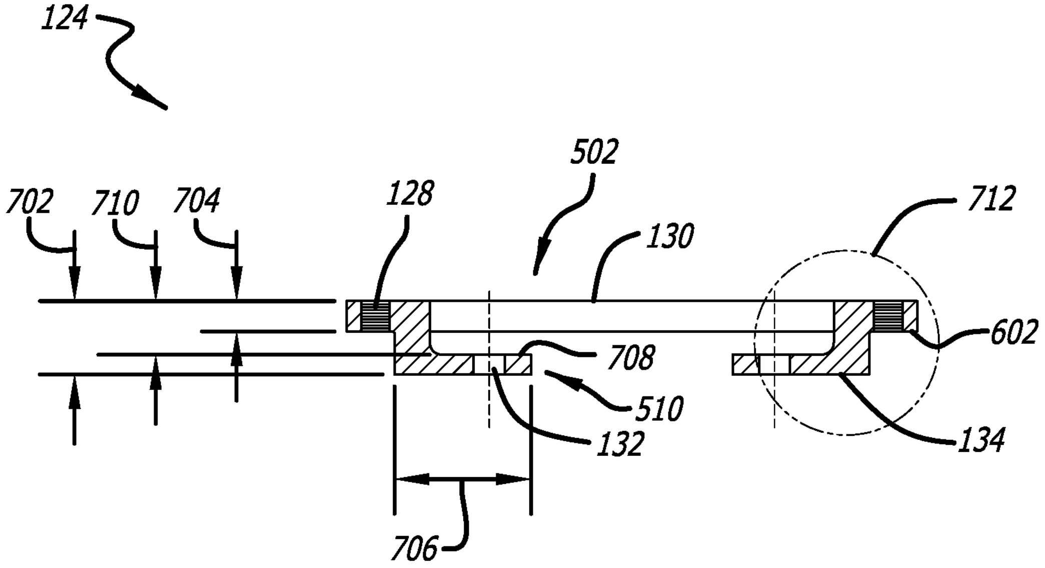
FIG. 7A shows a diagram of a cross-sectional side view of the driver plate of the recessed lighting fixture of FIG. 1, according to an example embodiment of the present disclosure.

FIG. 7A shows a diagram of a cross-sectional side view of the driver plate 124 through the cross-section A-A of FIG. 5. An overall height 702 of the driver plate 124 extends from the top surface 130 (aligned with the outer ring 502) to the bottom surface 134 (aligned with the protrusions 510). In some embodiments, the overall height 702 may be from 5 to 15 mm, for example, 5 to 8 mm, 8 to 12 mm, or 12 to 15 mm. In a preferred embodiment, the overall height 702 is approximately 8 mm. FIG. 7A illustrates a thickness 704 of the outer ring 502 which extends from the top surface 130 of the driver plate 124 to the lower surface 602 of the outer ring 502. In some embodiments, the thickness 704 may be from 1 to 7 mm, for example, 1 to 3 mm, 3 to 5 mm, or 5 to 7 mm. In a preferred embodiment, the thickness 704 is approximately 3 mm.

As can be seen in FIG. 7A, the second apertures 128 extend fully through the thickness 704 of the outer ring 502. Each of the protrusions 510 has a length 706 and a thickness which extends from a top surface 708 to the bottom surface 134 of the driver plate 124. In some embodiments, the length 706 may be from 10 to 30 mm, for example, 10 to 20 mm or 20 to 30 mm. In a preferred embodiment, the length 706 is approximately 14 mm. As can be seen in FIG. 7A, the third apertures 132 extend fully through the thickness of the protrusions 510. FIG. 7A further illustrates a distance 710 from the top surface 708 of the protrusions 510 to the top surface 130 of the driver plate 124. In some embodiments, the distance 710 may be from 4 to 10 mm, for example, 4 to 6 mm, 6 to 8 mm, or 8 to 10 mm. In a preferred embodiment, the distance 710 is approximately 5 mm. A distance from the lower surface 602 of the outer ring 502 to the bottom surface 134 of the driver plate 124 may approximately correspond to a distance between the top surface 140 and the recessed surface 138 of the heat sink module 126.

Figure 7B:
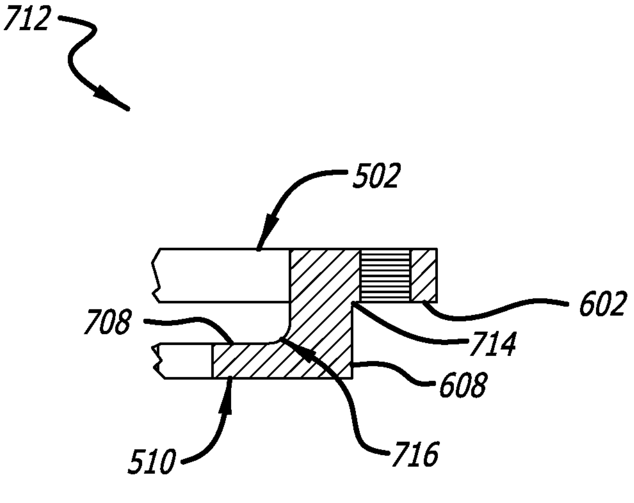
FIG. 7B shows a diagram of a detail view of the cross-sectional side view of FIG. 7A, according to an example embodiment of the present disclosure.

A detail area 712 of the cross-sectional view of the driver plate 124 of FIG. 7A is illustrated in FIG. 7B. The geometry of the example driver plate 124 may include one or more radii or fillets configured to reduce stress concentration and improve strength. For example, a first radius 714 may be located at the corner of the lower surface 602 of the outer ring 502 and the base 608 of the protrusions 510. In some embodiments, the first radius 714 may be approximately 0.5 mm. A second radius 716 may be located where the top surface 708 of the protrusions 510 transitions to a vertical portion of the protrusions 510. In some embodiments, the second radius 716 may be approximately 1.5 mm.

Figure 8:
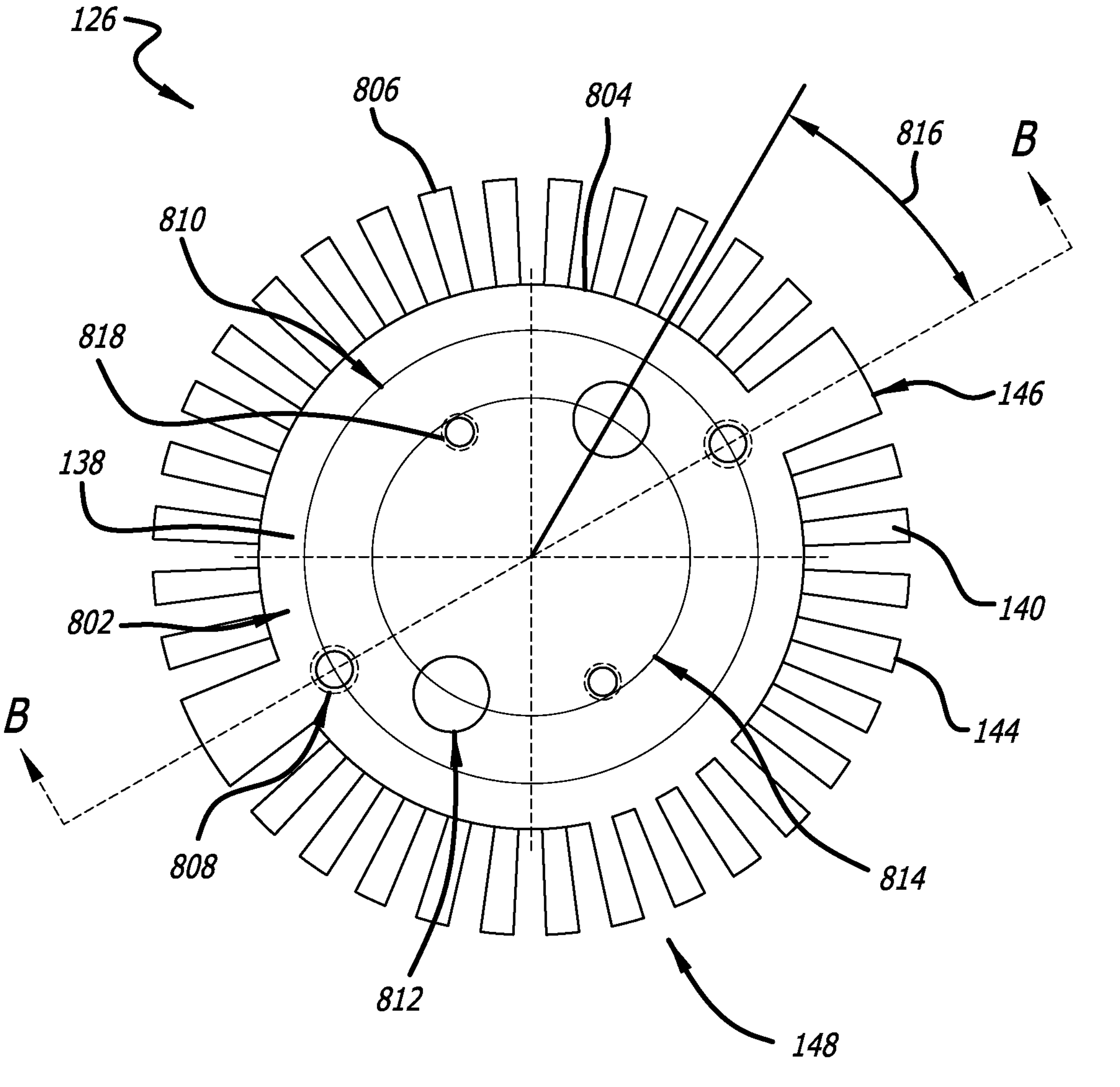
FIG. 8 shows a diagram of a top view of the heat sink module of the recessed lighting fixture of FIG. 1, according to an example embodiment of the present disclosure.

FIG. 8 shows a diagram of a top view of the heat sink module 126 of the recessed lighting fixture 100 of FIG. 1. The recessed surface 138 can be seen in the top view of FIG. 8 which includes a top surface of a center portion 802 of the heat sink module, the wide fins 146, and the notched portion 148. The top surface 140 of the heat sink module 126 includes a top surface of the remainder of the fins 144. The fins 144 and the wide fins 146 extend radially outward from an outer diameter 804 of the center portion 802 to an outer diameter 806 of the heat sink module 126. In some embodiments, the outer diameter 806 may be from 30 to 90 mm, for example, 30 to 50 mm, 50 to 70 mm, or 70 to 90 mm. In a preferred embodiment, the outer diameter 806 is approximately 50 mm.

Figure 12:
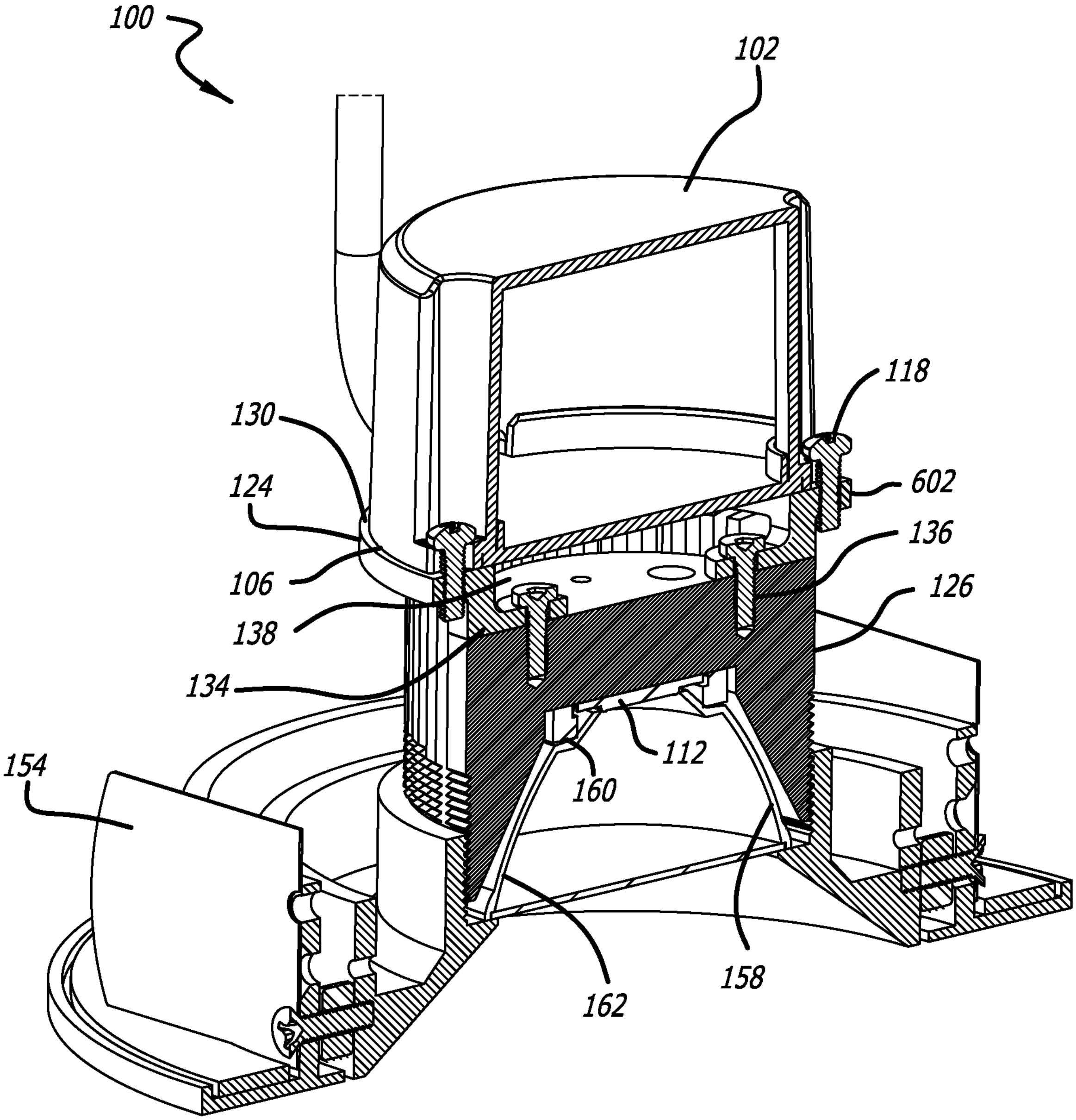
FIG. 12 shows a diagram of a perspective cross-sectional side view of the recessed lighting fixture of FIG. 1 in an assembled configuration, according to an example embodiment of the present disclosure.

The example heat sink module 126 includes fourth apertures 808 which extend downward from the recessed surface 138 and are located on a circle having a diameter 810 which is co-centric with the outer diameter 806 of the heat sink module 126. In some embodiments, the diameter 810 may be from 10 to 70 mm, for example, 10 to 30 mm, 30 to 50 mm, or 50 to 70 mm. In a preferred embodiment, the diameter 810 is approximately 30 mm. The fourth apertures 808 are configured to receive the second fasteners 136 which couple the driver plate 124 to the heat sink module 126. As shown in FIG. 8, the fourth apertures 808 may be threaded. As such, the second fasteners 136 may be fed through the (threaded or unthreaded) third apertures 132 of the driver plate 124 and threaded into the fourth apertures 808 in order to mechanically couple the driver plate 124 and the heat sink module 126. The example heat sink module 126 includes two of the fourth apertures 808, each of which are approximately radially aligned with one of the wide fins 146. Thus, as shown in FIG. 12 described below, when the driver plate 124 is coupled with the heat sink module 126 via the third apertures 132 and the fourth apertures 808, the protrusions 510 of the driver plate 124 may be situated into the recessed portion of the wide fins 146.

The example heat sink module further includes fifth apertures 812 which extend downward from the recessed surface 138 and are located on a circle having a diameter 814 which is co-centric with the outer diameter 804 of the center portion 802. In some embodiments, the diameter 814 including the fifth apertures 812 is between, for example, 10 and 50 mm. In a preferred embodiment, the diameter 814 is approximately 21 mm. Further, the fifth apertures 812 may be radially spaced at an angle 816 from the fourth apertures 808. In some embodiments, the angle 816 may be approximately 30 degrees. In other embodiments, the angle 816 may be from 0 to 90 degrees. The example fifth apertures 812 may extend fully through the height of the heat sink module 126 to allow for passage of one or more wire harnesses to pass through the fifth apertures 812. Accordingly, the fifth apertures 812 may be sized to accommodate such wire harnesses. In some embodiments, the fifth apertures 812 may be from 2 to 10 mm in diameter, for example, 5 mm. In the example of FIG. 8, the heat sink module 126 includes 2 of the fifth apertures 812. In other embodiments, the heat sink module 126 may include less (e.g., one) or more (e.g., three, four, five, six, etc.) fifth apertures 812.

Additionally, the example heat sink module 126 of FIG. 8 includes sixth apertures 818 which extend downward from the recessed surface 138 and are located on a circle that is co-centric with the outer diameter 804 of the center portion 802. The example sixth apertures 818 may extend fully through the height of the heat sink module 126. In some embodiments, the sixth apertures 818 are fully threaded. The example sixth apertures 818 may be configured to receive the third fasteners 164 to couple the LED module holder 160 to the heat sink module 126.

Figure 9:
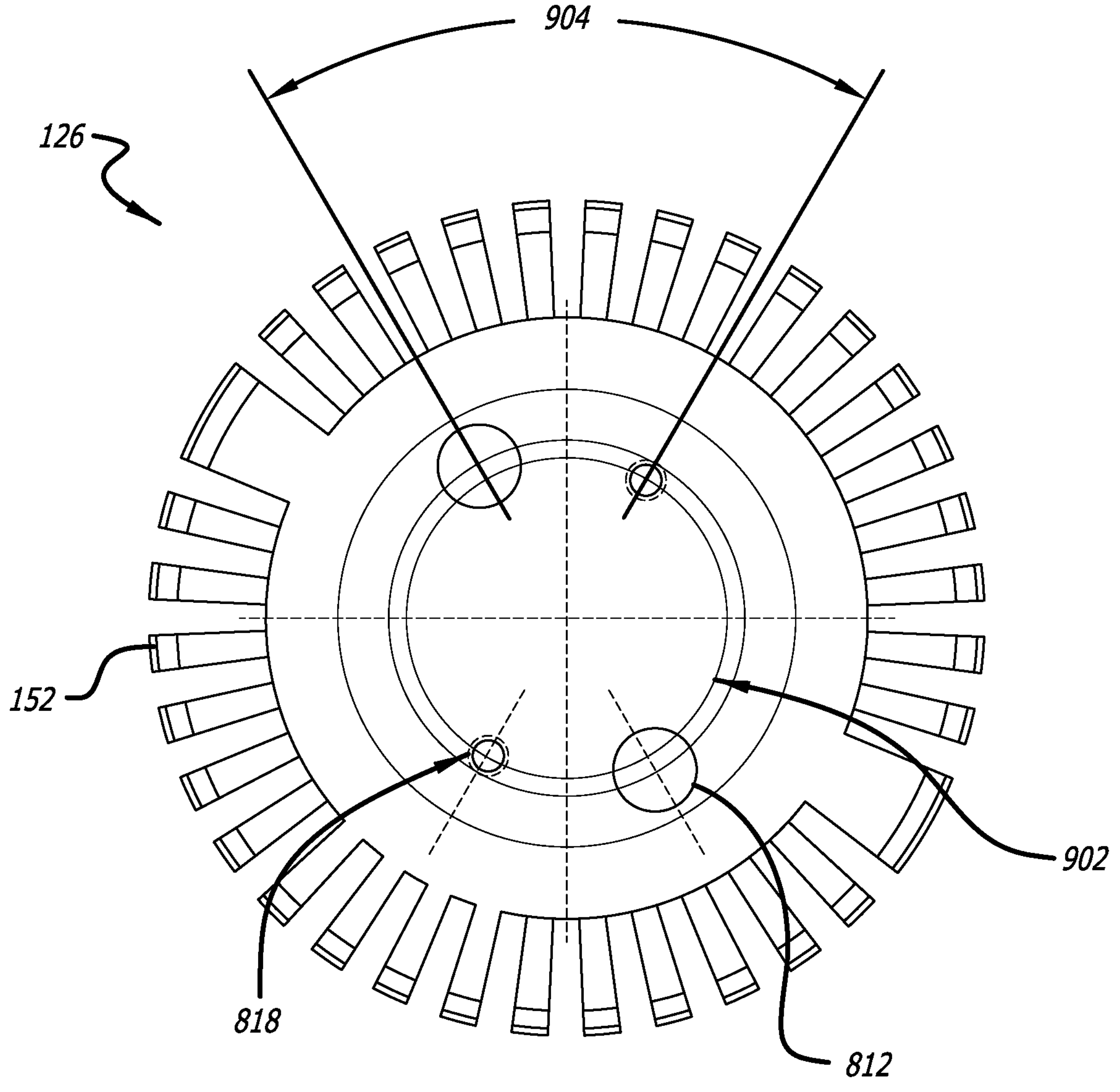
FIG. 9 shows a diagram of a bottom view of the heat sink module of the recessed lighting fixture of FIG. 1, according to an example embodiment of the present disclosure.

FIG. 9 shows a diagram of a bottom view of the heat sink module 126 of the recessed lighting fixture 100 of FIG. 1. The bottom view illustrates a diameter 902 of the circle on which the sixth apertures 818 are located. In some embodiments, the diameter 902 including the sixth apertures 818 is between, for example, 10 and 50 mm. In a preferred embodiment, the diameter 902 is approximately 19 mm. Further, FIG. 9 illustrates that the sixth apertures 818 are radially spaced at an angle 904 from the fifth apertures 812. In some embodiments, the angle 904 may be approximately 60 degrees. In some embodiments, the angle 904 may be from 0 to 90 degrees. Lastly, the external threads of the lower portion 152 may be seen in the bottom view of FIG. 9.

Figure 10:
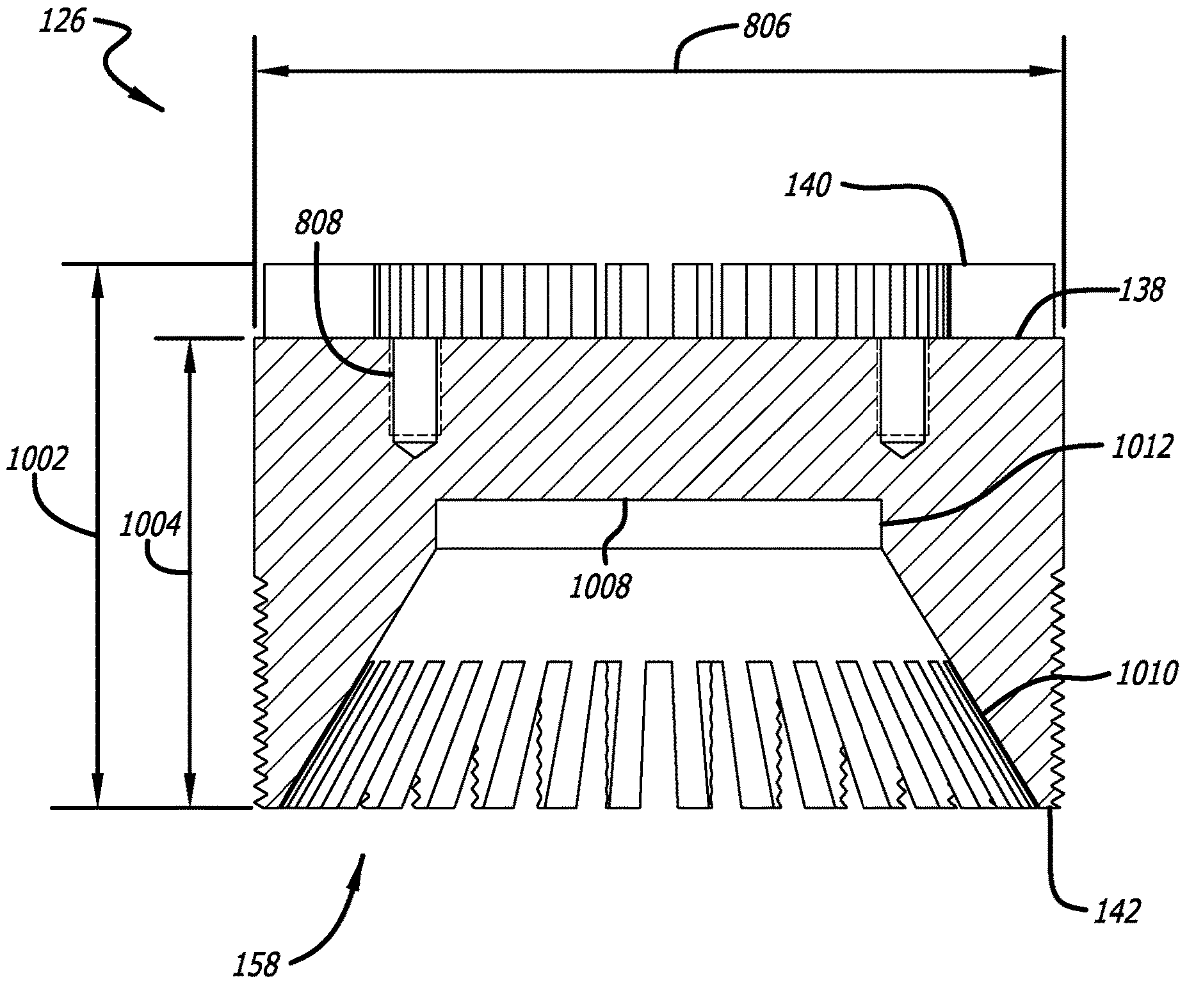
FIG. 10 shows a diagram of a cross-sectional side view of the heat sink module of the recessed lighting fixture of FIG. 1, according to an example embodiment of the present disclosure.

FIG. 10 shows a diagram of a cross-sectional side view of the heat sink module 126 through the cross-section B-B of FIG. 8. The example heat sink module 126 has an overall diameter 806 and an overall height 1002 which extends from the top surface 140 to the bottom surface 142. In some embodiments, the overall height 1002 is between, for example, 15 and 75 mm. In a preferred embodiment, the overall height 1002 is approximately 34 mm. FIG. 8 further illustrates a distance 1004 from the recessed surface 138 to the bottom surface 142. In some embodiments, the distance 1004 is between, for example, 10 and 50 mm. In a preferred embodiment, the distance 1004 is approximately 29 mm. The fourth apertures 808 can be seen which extend down from the recessed surface 138. In the example heat sink module 126, the fourth apertures do not extend fully through the distance 1004, but have a depth which can accommodate the second fasteners 136.

The heat sink module 126 further includes the conical cavity 158 configured to accommodate the LED module 112, the LED module holder 160, and the reflector 162. The conical cavity 158 extends from the bottom surface 142 to a top cavity surface 1008. The cavity 158 may have any shape suitable to accommodate the LED module 112, the LED module holder 160, and the reflector 162 and suitable for coupling the LED module 112 and the LED module holder 160 to the heat sink module 126. In the example of FIG. 10, the example cavity 158 includes a lower conical portion 1010 and an upper cylindrical portion 1012. The lower conical portion 1010 may be configured to accommodate a shape of the reflector 162. As shown in the perspective cross-sectional view of FIG. 12, the upper cylindrical portion 1012 may be configured to provide space for the LED module holder 160 between the reflector 162 and the interior surface of the cavity 158.

Figure 11A:
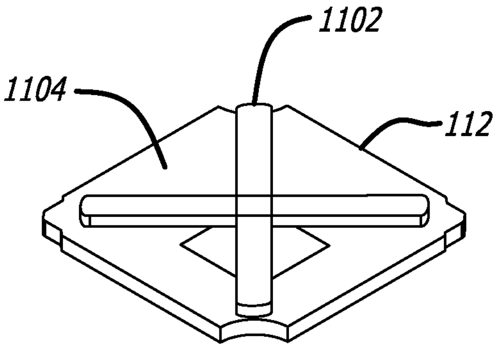
FIG. 11A shows a diagram of a perspective view of the LED module of the recessed lighting fixture of FIG. 1, according to an example embodiment of the present disclosure.
Figure 11B:
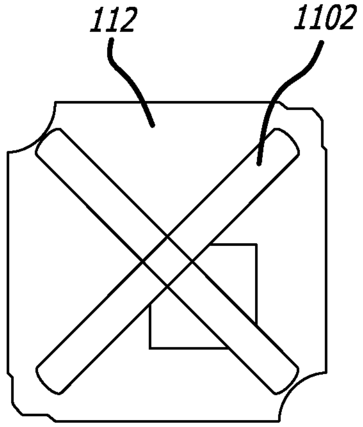
FIG. 11B shows a diagram of a top view of the LED module of the recessed lighting fixture of FIG. 1, according to an example embodiment of the present disclosure.

FIGS. 11A-11B show diagrams of a perspective view and a top view of the LED module 112 in an example assembly-ready configuration. In preparation for assembling the LED module 112 to the heat sink module 126, thermal paste 1102 may be applied to a top surface 1104 of the LED module 112. The example thermal paste 1102 may serve as an interface between the LED module 112 (e.g., heat source) and the heat sink module 126 to maximize heat transfer between the LED module 112 and the heat sink module 126. The thermal paste 1102 may be applied to the top surface 1104 of the LED module 112 in a pattern such as the X-shape shown in FIGS. 11A and 11B. In other examples, the thermal paste 1102 may be applied in any other uniform distribution across the top surface 1104 to allow for optimal heat dissipation between the LED module 112 and the heat sink module 126. For example, the thermal paste 1102 may be applied in a thin uniform layer, in a circular shape, in a ring shape, or any other shape allowing for uniform distribution.

Figure 11C:
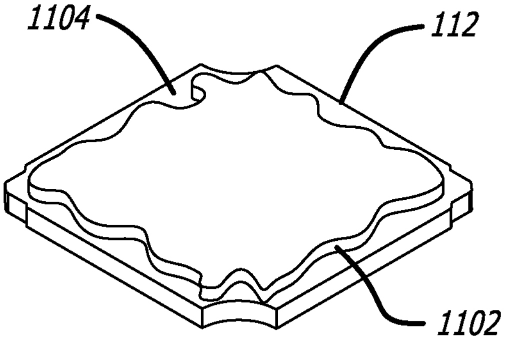
FIG. 11C shows a diagram of a perspective view of the LED module of the recessed lighting fixture of FIG. 1 in an assembled configuration, according to an example embodiment of the present disclosure.
Figure 11D:
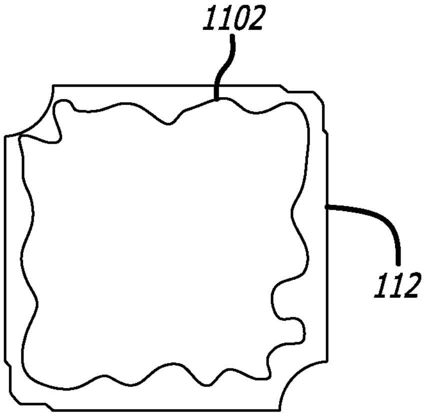
FIG. 11D shows a diagram of a top view of the LED module of the recessed lighting fixture of FIG. 1 in an assembled configuration, according to an example embodiment of the present disclosure.
Figure 11E:
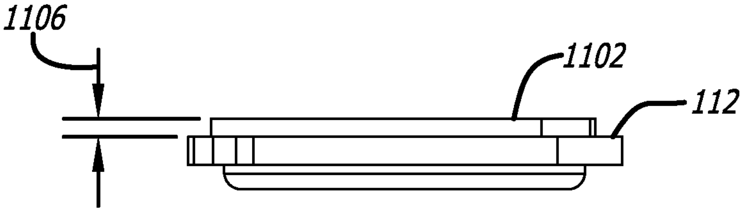
FIG. 11E shows a diagram of a side view of the LED module of the recessed lighting fixture of FIG. 1, according to an example embodiment of the present disclosure.

After application of the thermal paste 1102, the LED module 112 may be assembled with the top cavity surface 1008 of the heat sink module 126. Upon assembly, the thermal paste 1102 distributes across the top surface 1104 as seen in the perspective view and top view of FIGS. 11C and 11D. While FIGS. 11C and 11D show an example distributed shape of the thermal paste 1102, it should be understood that the thermal paste 1102 may conform to any approximately uniform distribution across the top surface 1104 which preferably does not exceed the boundaries of the LED module 112. Further, a thickness 1106 of the thermal paste 1102 is shown in the side view of FIG. 11E. In some embodiments, the thickness is approximately 0.6 mm. In other embodiments, the thickness may be from 0.1 to 2 mm. The example thermal paste 1102 does not confer a mechanical bond between the LED module 112 and the heat sink module 126. In other embodiments, a thermal adhesive may be used in lieu of or in addition to the thermal paste which provides heat transfer as well as mechanical bonding.

FIG. 12 shows a diagram of a perspective cross-sectional side view of the recessed lighting fixture 100 of FIG. 1 in an assembled configuration. In FIG. 12, the first fasteners 118 can be seen coupling the driver housing 102 to the driver plate 124. Additionally, the second fasteners 136 can be seen coupling the driver plate 124 to the heat sink module 126. The trim piece 154 is shown threaded onto the external threads of the heat sink module 126. Additionally, the LED module 112, the LED module holder 160, and the reflector 162 are shown situated in the cavity 158 of the heat sink module 126.

To assemble the recessed lighting fixture 100, the thermal paste 1102 may be applied to the LED module 112 and the LED module 112 may be placed on the top cavity surface 1008 of the heat sink module 126. The LED module holder 160 may then be installed in the cavity 158 of the heat sink module 126 using the third fasteners 164, thereby fixing the position of the LED module 112 with respect to the heat sink module 126. Before or after installation of the LED module 112 in the cavity 158, one or more wire harnesses may be fed through the fifth apertures 812 in the center portion 802 of the heat sink module 126 and out of the notched portion 148.

The driver plate 124 may then be installed on the heat sink module 126 by insertion of the second fasteners 136 through the third apertures 132 of the driver plate 124 and the fourth apertures 808 of the heat sink module 126. As shown in FIG. 12, when the driver plate 124 is assembled with the heat sink module 126, the bottom surface 134 of the driver plate 124 mates with the recessed surface 138 of the heat sink module 126 while the lower surface 602 of the outer ring 502 of the driver plate 124 mates with the top surface 140 of the heat sink module 126. Accordingly, a distance from the lower surface 602 of the outer ring 502 of the driver plate 124 to the bottom surface 134 of the driver plate 124 may be substantially the same as a distance between the top surface 140 and the recessed surface 138 of the heat sink module 126.

The driver plate 124 may then be assembled with the driver housing 102 by insertion of the first fasteners 118 through the first apertures 116 of the driver housing 102 and into the second apertures 128 of the driver plate 124. When assembled, the top surface 130 of the driver plate 124 mates with the bottom surface 106 of the driver housing 102. Before or after installation of the driver plate 124 to the driver housing 102, one or more wire harnesses may be fed through the one or more openings 122 in the walls 108 of the driver housing 102. In some embodiments, the driver plate 124 is first installed on the driver housing 102 and then assembled with the heat sink module 126. To complete assembly of the recessed lighting fixture 100, the reflector 162 may be installed in the cavity 158 of the heat sink module 126 with respective pins 170 aligned with the two or more apertures 172 in the LED module holder 160. The trim piece 154 may then be threaded onto the external threads of the heat sink module 126, fixing the axial position of the reflector 162 and completing assembly of the recessed lighting fixture 100.

Recessed Lighting Fixture Second Embodiment

Figure 13:
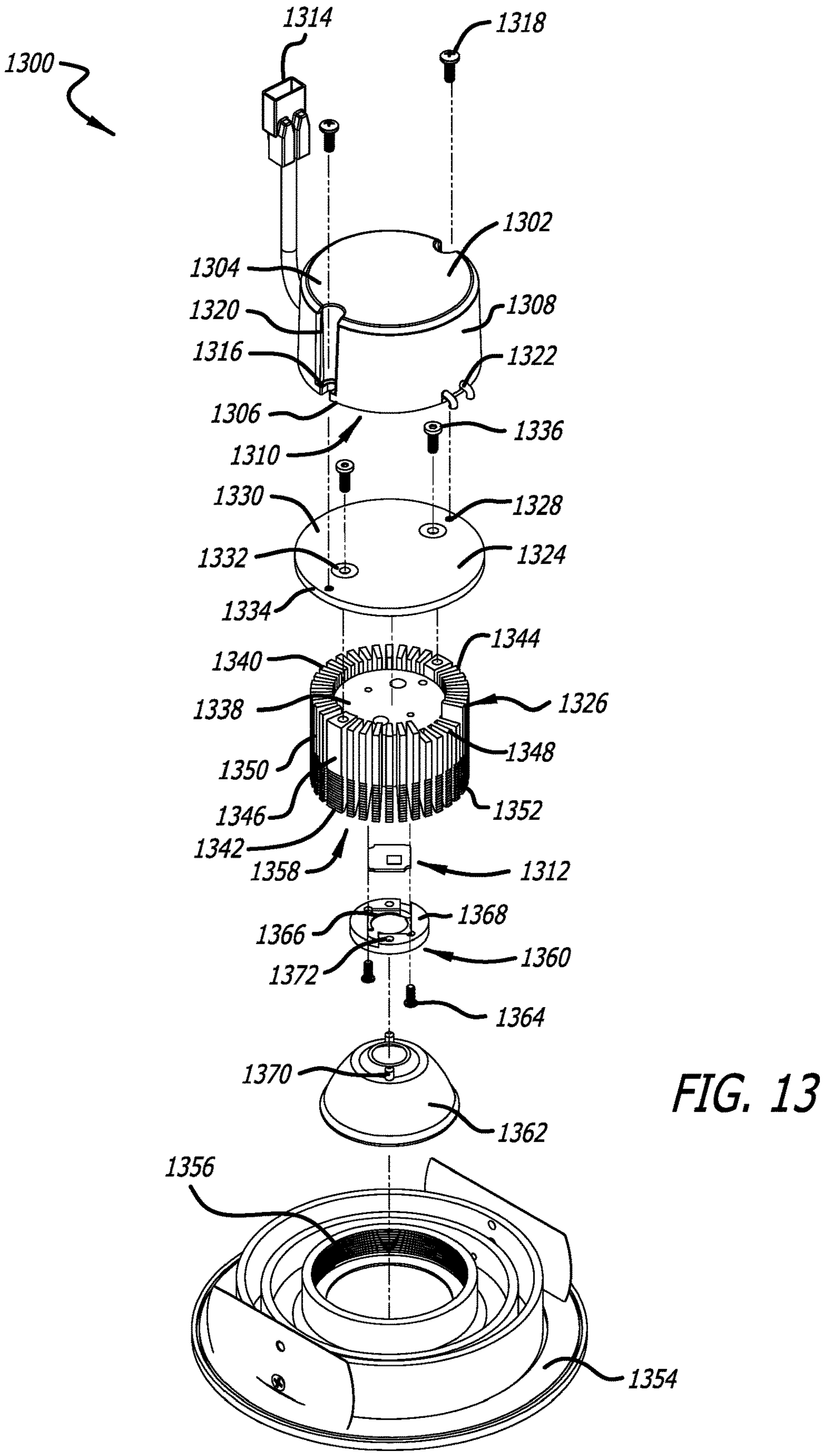
FIG. 13 shows a diagram of a perspective view of a second recessed lighting fixture, according to an example embodiment of the present disclosure.
Figure 25B:
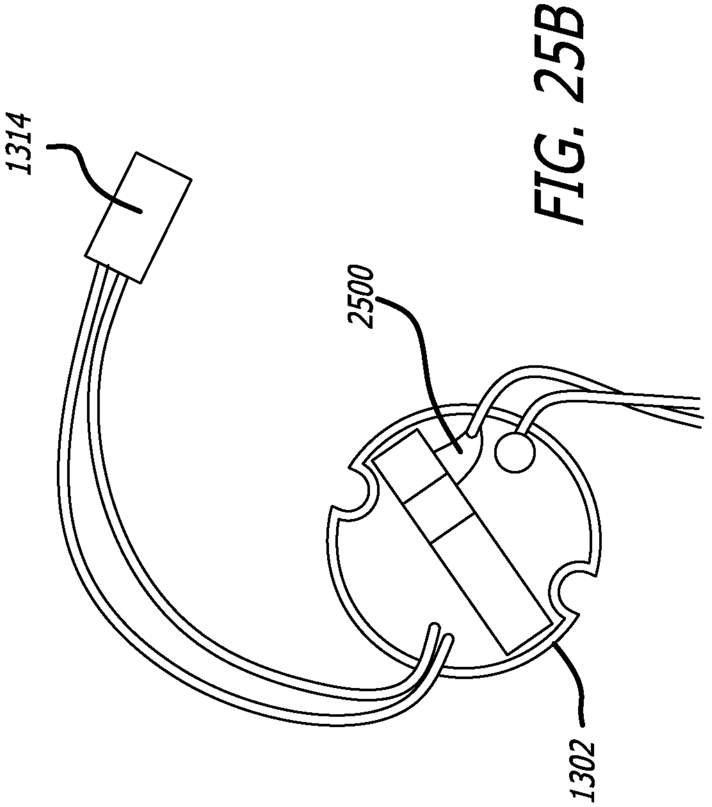
FIGS. 25A and 25B illustrate an example driver housing according to the second embodiment of the recessed lighting fixture in a top perspective view and a bottom perspective view, according to an example embodiment of the present disclosure.
Figure 25A:
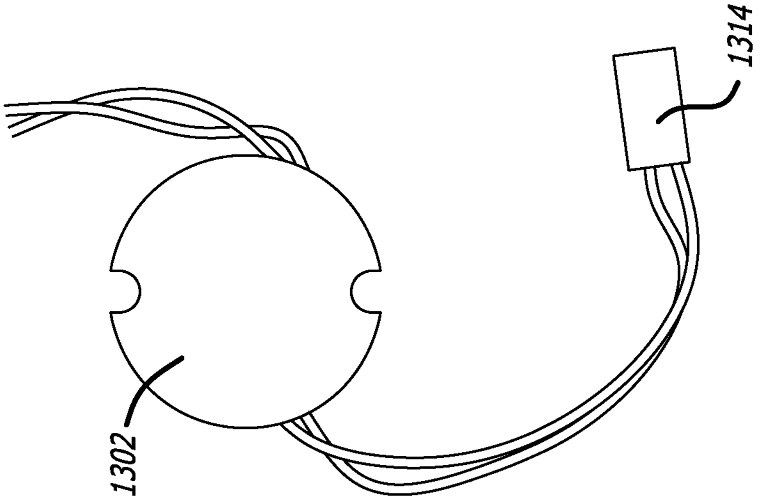

FIGS. 13 to 23 show a second embodiment of a second recessed lighting fixture disclosed herein. FIG. 13 shows a diagram of a perspective view of a second recessed lighting fixture 1300, according to an example embodiment of the present disclosure. The example second recessed lighting fixture 1300 includes a driver housing 1302. The example driver housing 1302 is substantially cylindrical having a closed end 1304 (e.g., top end, top surface) and an open end 1306 (e.g., bottom end, bottom surface). The walls 1308 of the driver housing 1302 and the closed end 1304 form a cavity 1310 which is configured to hold an LED driver. The LED driver (not pictured) regulates the power supplied to an LED module 1312 of the second recessed lighting fixture 1300. For example, the LED driver may convert AC input voltage delivered to the second recessed lighting fixture 1300 to low power DC voltage compatible with the LED module 1312. The cavity 1310 of the driver housing 1302 may further house one or more wire harness assemblies configured to deliver power to the LED driver or from the LED driver to the LED module 1312. While the driver housing 1302 may be illustrated in FIGS. 13 to 23 with the internal components omitted, it should be understood that the second recessed lighting fixture 1300 includes a fully populated driver housing 1302. For example, the driver housing 1302 includes multiple electrical components that are secured and encapsulated using potting material. An example populated driver housing 1302 is illustrated in FIGS. 25A-25B.

The example driver housing 1302 includes one or more openings 1322 in the walls 1308 which may provide for passage of the one or more wire harness assemblies into the cavity 1310. For example, the second recessed lighting fixture 1300 further includes a wiring assembly 1314 which passes through one of the one or more openings 1322 into the driver housing 1302. The example wiring assembly 1314 is configured to deliver power to the LED driver.

The bottom surface 1306 of the driver housing 1302 includes two or more first apertures 1316 for receiving first fasteners 1318. The example driver housing 1302 further includes at least two notches 1320 in the walls 1308 and the closed end 1304 which axially align with the two or more first apertures 1316. Accordingly, the notches 1320 provide an assembly path for installing the first fasteners 1318 in the two or more first apertures 1316.

The example second recessed lighting fixture 1300 of FIG. 13 includes a driver plate 1324. The example driver plate 1324, discussed in further detail below in connection with FIGS. 17-19B, provides for mechanical coupling of the driver housing 1302 and a heat sink module 1326. The driver plate 1324 may be formed from a high temperature compatible polymer material. For example, polymer material of the driver plate 1324 may have a temperature rating of at least 120° C. in order to prevent distortion of the driver plate 1324 during use of the second recessed lighting fixture 1300. In other embodiments, the driver plate 1324 may be formed from a metallic, composite, or any other temperature compatible material.

Second apertures 1328 on a top surface 1330 of the driver plate 1324 are configured to receive the first fasteners 1318 to removably couple the driver plate 1324 with the driver housing 1302. When assembled, the top surface 1330 of the driver plate 1324 mates with the open end 1306 of the driver housing 1302. Additionally, the driver plate 1324 includes third apertures 1332 which extend from the top surface 1330 through a bottom surface 1334 of the driver plate 1324. The example third apertures 1332 are configured to receive second fasteners 1336 to removably couple the driver plate 1324 with the heat sink module 1326. When assembled, the bottom surface 1334 of the driver plate 1324 mates with a top surface 1340 of the heat sink module 1326. Accordingly, when assembled, the driver housing 1302 is indirectly and removably coupled to the heat sink module 1326 via the driver plate 1324.

The example heat sink module 1326, discussed in further detail below in connection with FIGS. 20-22, may be made from an extruded metal suitable for efficient heat dissipation such as aluminum. Additionally, one or more post-processes may be performed on the metal extrusion such as drilling, tapping, and turning to form the features disclosed herein. The example heat sink module 1326 is substantially cylindrical extending from the top surface 1340 to a bottom surface 1342. The heat sink module 1326 includes a plurality of spaced fins 1344 radiating outward from an outer diameter of a recessed surface 1338 to an outer diameter of the heat sink module 1326. The fins 1344 serve to increase the surface area of the heat sink module 1326 to assist in heat dissipation.

A majority portion of the fins 1344 are a first width and extend from the top surface 1340 to the bottom surface 1342 of the heat sink module 1326. The example heat sink module further includes two or more wide fins 1346 which also extend from the top surface 1340 to the bottom surface 1342. Further, the example heat sink module 1326 may include a notched portion 1348 where a portion of the fins 1344 extend from the recessed surface 1338 to the bottom surface 1342. The notched portion 1348 may allow for passage of one or more wire harnesses between the LED module 1312 and the driver housing 1302.

Additionally, the example heat sink module 1326 includes an upper portion 1350 and a lower portion 1352. The example lower portion 1352 of the heat sink module 1326 may include external threads to provide for attachment of a trim piece 1354. For example, the trim piece 1354 may include internal threads 1356 which are compatible with the external threads of the lower portion 1352. The disclosed configuration allows for easy installation of and removal of the trim piece 1354 to support ease of installation of the second recessed lighting fixture 1300 and for simple customization of the second recessed lighting fixture 1300 by replacement of the trim piece 1354. While the example second recessed lighting fixture 1300 of FIG. 13 is shown in connection with the trim piece 1354, it should be understood that any suitable trim piece may be used which is compatible with the external threads of the heat sink module 1326.

The example heat sink module 1326 further includes a conical cavity 1358 extending inward from the bottom surface 1342. The conical cavity 1358 may be a hollow cutout of the heat sink module 1326 configured to hold the LED module 1312, an LED module holder 1360 and a reflector 1362. The example LED module holder 1360 is configured to removably couple to the heat sink module 1326 via third fasteners 1364 in order to maintain a relative position of the LED module 1312 and the heat sink module 1326. For example, the LED module holder 1360 may include a chip cavity 1366 which is shaped to receive the LED module 1312. Accordingly, when a top surface 1368 of the LED module holder 1360 is mated with the heat sink module 1326, relative movement of the LED module 1312 and the heat sink module 1326 is restricted.

The example reflector 1362 is configured to reflect at least a portion of the light emitted by the LED module 1312. In some embodiments, the reflector 1362 may provide spot reflection where the light is directed to a focused illumination area. In other embodiments, the reflector 1362, may provide flood reflection where the light is directed to a wide illumination area. In some embodiments, the reflector 1362 may provide narrow flood reflection with the illumination area falling between the focused and wide illumination areas of the spot and flood reflectors. The example reflector 1362 includes two or more pins 1370 extending away from the reflection surface. The two or more pins 1370 are configured to be received by two or more apertures 1372 in the LED module holder 1360. As such, the reflector 1362 may be coupled with the LED module holder 1360 to restrict axial and rotational movement of the reflector 1362 by placement of the pins 1370 in the apertures 1372. Further, upon assembly of the trim piece 1354 onto the heat sink module 1326, longitudinal movement of the reflector 1362 may further be restricted to fix the relative position of the reflector in the second recessed lighting fixture 1300.

Figure 14:
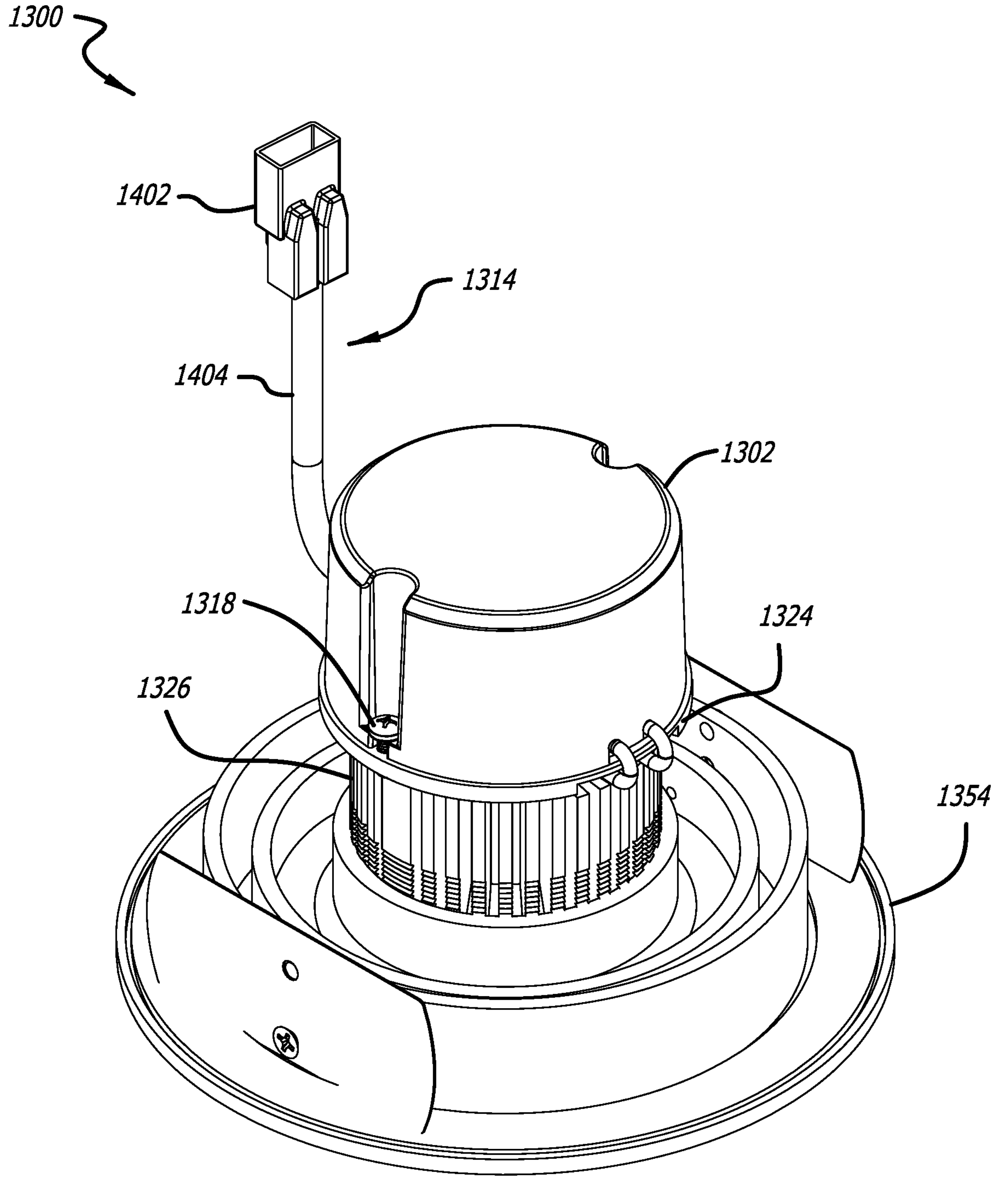
FIG. 14 shows a diagram of a perspective view of the second recessed lighting fixture of FIG. 13 in an assembled configuration, according to an example embodiment of the present disclosure.
Figure 15:
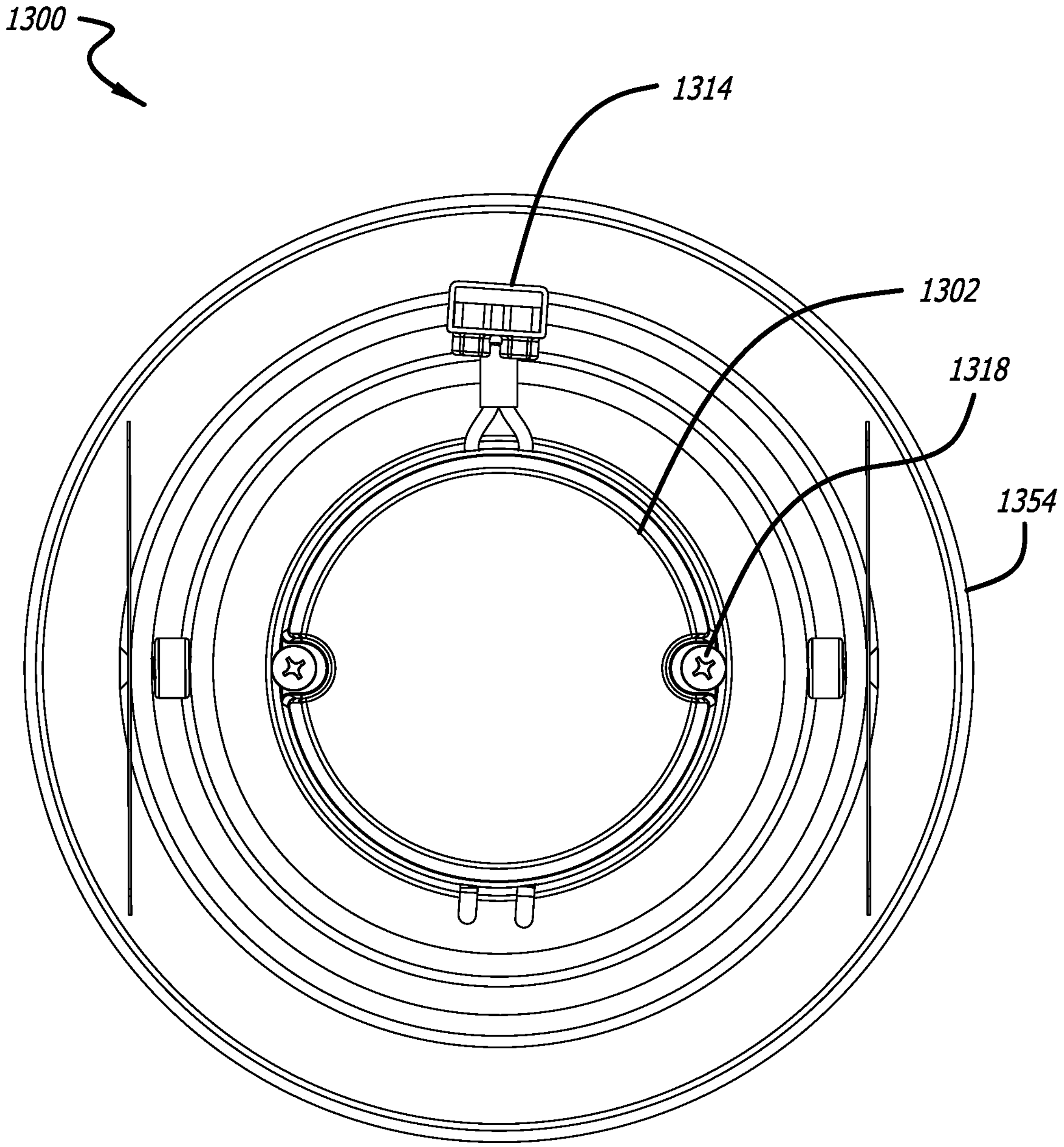
FIG. 15 shows a diagram of a top view of the second recessed lighting fixture of FIG. 13, according to an example embodiment of the present disclosure.

FIGS. 14 and 15 show diagrams of a perspective view and a top view of the second recessed lighting fixture 1300 of FIG. 13 in an assembled configuration. The example driver housing 1302 can be seen coupled to the driver plate 1324 via the first fasteners 1318. Below the driver plate 1324 is the heat sink module 1326 which is attached via the second fasteners (not shown). Additionally, the example trim piece 1354 is shown coupled to the heat sink module 1326 via the external threads of the heat sink module 1326. The example wiring assembly 1314 is shown which includes a connector 1402 and a wire harness 1404. The example connector 1402 of FIG. 14 is a female connector. In some embodiments, the connector 1402 may be a male connector or a genderless connector.

Figure 16:
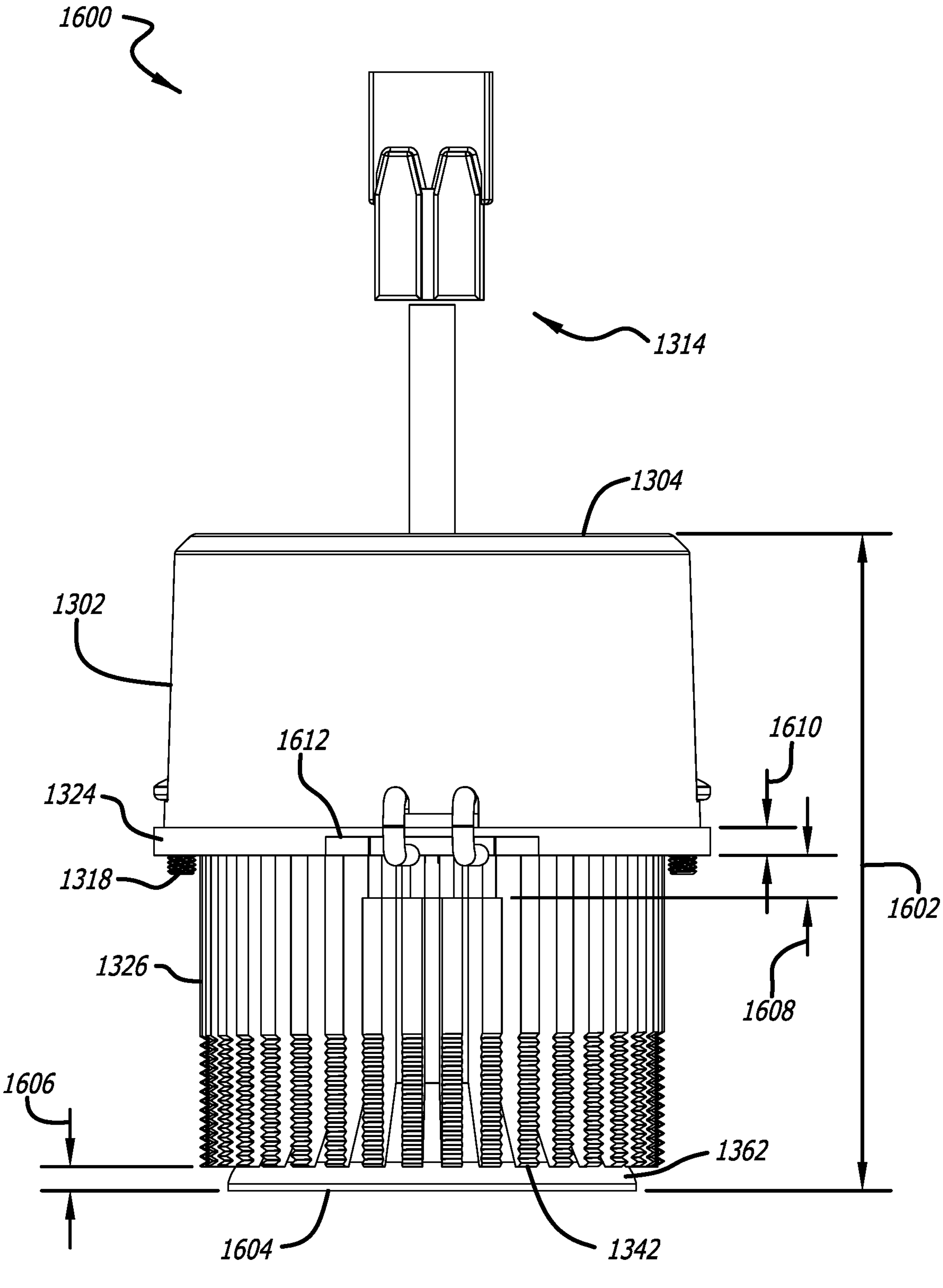
FIG. 16 shows a diagram of a side view of the second recessed lighting fixture of FIG. 13 with the trim omitted, according to an example embodiment of the present disclosure.

FIG. 16 shows a diagram of a side view of a subassembly 1600 of the second recessed lighting fixture 1300 of FIG. 13. In the subassembly 1600, the trim piece 1354 is omitted from the second recessed lighting fixture 1300. An overall height 1602 of the subassembly 1600 is defined by a distance from the top surface 1304 of the driver housing 1302 to a bottom surface 1604 of the reflector 1362. In some embodiments, the overall height 1602 may be from 40 to 100 mm, for example, 40 to 60 mm, 60 to 80 mm, or 80 to 100 mm. In a preferred embodiment, the overall height 1602 is approximately 71 mm. In the disclosed embodiment, when fully assembled, the bottom surface 1604 of the reflector 1362 does not sit flush with the bottom surface 1342 of the heat sink module 1326. For example, the bottom surface 1604 of the reflector 1362 may extend a first distance 1606 past the bottom surface 1342 of the heat sink module 1326. In some embodiments, the first distance 1606 may be from 0 to 10 mm, for example, 0 to 2 mm, 2 to 4 mm, 4 to 6 mm, 6 to 8 mm, or 8 to 10 mm. In a preferred embodiment, the first distance 1606 is approximately 2.6 mm. Further, FIG. 16 illustrates a height 1608 of the notched portion 1348. Accordingly, the height 1608 represents a distance between the recessed surface 1338 and the top surface 1340 of the heat sink module 1326. In some embodiments, the height 1608 may be from 2 to 10 mm, for example, 2 to 4 mm, 4 to 6 mm, 6 to 8 mm, or 8 to 10 mm. In a preferred embodiment, the height 1608 is approximately 4.6 mm.

Additionally, FIG. 16 shows a height 1610 of a notched region 1612 of the driver plate 1324. Similar to the notched portion 1348 of the heat sink module 1326, the notched region 1612 of the driver plate 1324 may be configured to allow for passage of one or more wire harnesses to the driver housing 1302. In some embodiments, the height 1610 may be from 0 mm to the thickness of the driver plate 1324, for example, from 0 to 3 mm, from 0 to 5 mm. In a preferred embodiment, the height 1610 is 2 mm.

Figure 17A:
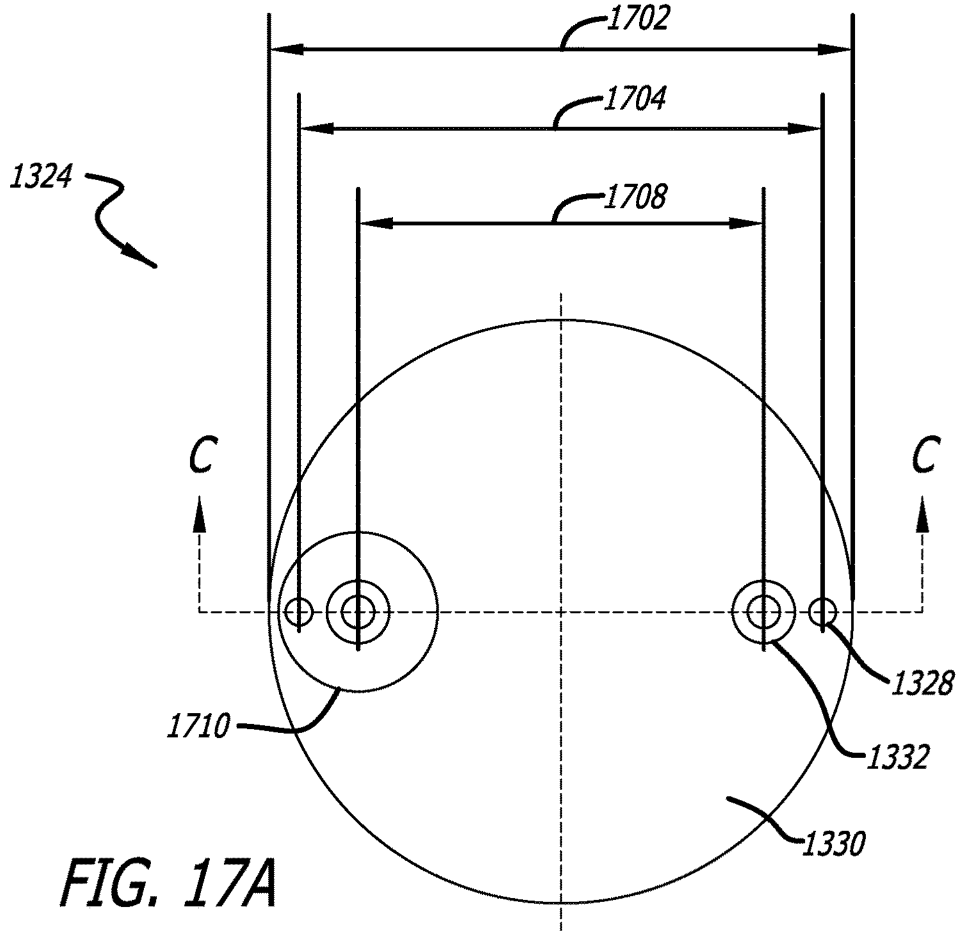
FIG. 17A shows a diagram of a top view of the driver plate of the second recessed lighting fixture of FIG. 13, according to an example embodiment of the present disclosure.

FIG. 17A shows a top view of the driver plate 1324 of the second recessed lighting fixture 1300 of FIG. 13. The top surface 1330 of the example driver plate 1324 is substantially circular and has an outer diameter 1702. In some embodiments, the outer diameter 1702 may be from 40 to 100 mm, for example, 40 to 60 mm, 60 to 80 mm, or 80 to 100 mm. In a preferred embodiment, the first diameter 1702 is approximately 60 mm. The second apertures 1328 extend from the top surface 1330 and are placed along a circle having a second diameter 1704 and being co-centric with the outer diameter 1702. In some embodiments, the second diameter 1704 may be from 30 to 90 mm, for example, 30 to 50 mm, 50 to 70 mm, or 70 to 90 mm. In a preferred embodiment, the second diameter 1704 is approximately 54 mm. In the example of FIG. 17A, the driver plate 1324 includes two second apertures 1328 which are evenly spaced. In another embodiments, the driver plate 1324 may include additional second apertures 1328 located along the circle having the second diameter 1704.

The example second apertures 1328 of FIG. 17 are fully threaded. Thus, the first fasteners 1318 may be threaded fasteners which may be fed through the first apertures 1316 (which may be threaded or unthreaded) of the driver housing 1302 and joined to the driver plate 1324 via threading into the second apertures 1328. In other embodiments, the second apertures 1328 may be threaded or unthreaded and a nut may be placed on the first fasteners 1318 on the underside of the driver plate 1324. Other means of mechanical fastening may be used to couple the driver housing 1302 and the driver plate 1324 via the first apertures 1316 and the second apertures 1328 such as rivets, welding, snap-fit fasteners, or any other suitable means.

The example driver plate 1324 further includes the example third apertures 1332 extending from the top surface 1330 and aligned with a circle having a diameter 1708 and being co-centric with the outer diameter 1702. In some embodiments, the diameter 1708 may be from 20 to 80 mm, for example, 20 to 40 mm, 40 to 60 mm, or 60 to 80 mm. In a preferred embodiment, the diameter 1708 is approximately 42 mm. In the illustrated embodiment, the third apertures 1332 are unthreaded apertures. In some embodiments, the third apertures 1332 may be threaded. Further, in the illustrated embodiment, the third apertures 1332 are counterbored apertures. In some embodiments, the third apertures 1332 may be countersunk or through hole apertures.

Figure 17B:
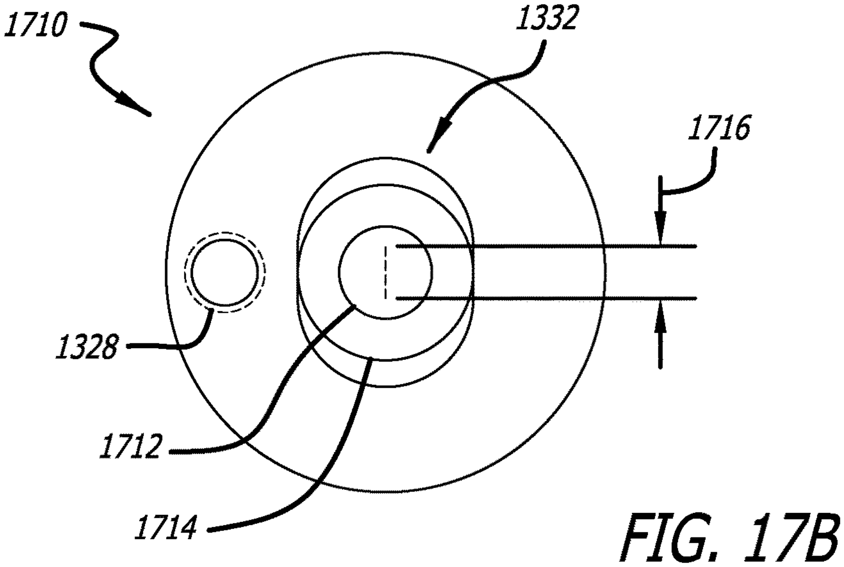
FIG. 17B shows a diagram of a detail view of the top view of the driver plate of FIG. 17A, according to an example embodiment of the present disclosure.

A detailed area 1710 of the top view of the driver plate 1324 of FIG. 17A is illustrated in FIG. 17B. The detailed area 1710 includes one of the second apertures 1328 and one of the third apertures 1332. The example third aperture 1332 shown in FIG. 17B is a counterbored aperture. For example, a center portion 1712 of the third aperture 1332 is a through-hole while an outer portion 1714 of the third aperture 1332 has a larger diameter than the center portion 1712 but does not extend through the thickness of the driver plate 1324. Accordingly, the outer portion 1714 of the third aperture 1332 allows for a fastener head to be at or below the top surface 1330 of the driver plate 1324 when assembled.

In some embodiments, at least one of the third apertures 1332 may be a slotted aperture. For example, the slotted aperture may include two half-circle portions connected by straight lines with the centers of the half-circle portions separated by a slot length 1716. In some embodiments, the slot length 1716 may be from 0 to 5 mm. In some embodiments, the slot length 1716 may be approximately 2 mm. Inclusion of one or more slotted apertures for the third apertures 1332 may improve the ease of assembly of the second recessed lighting fixture 1300, particularly the assembly of the driver plate 1324 to the heat sink module 1326.

Figure 18:
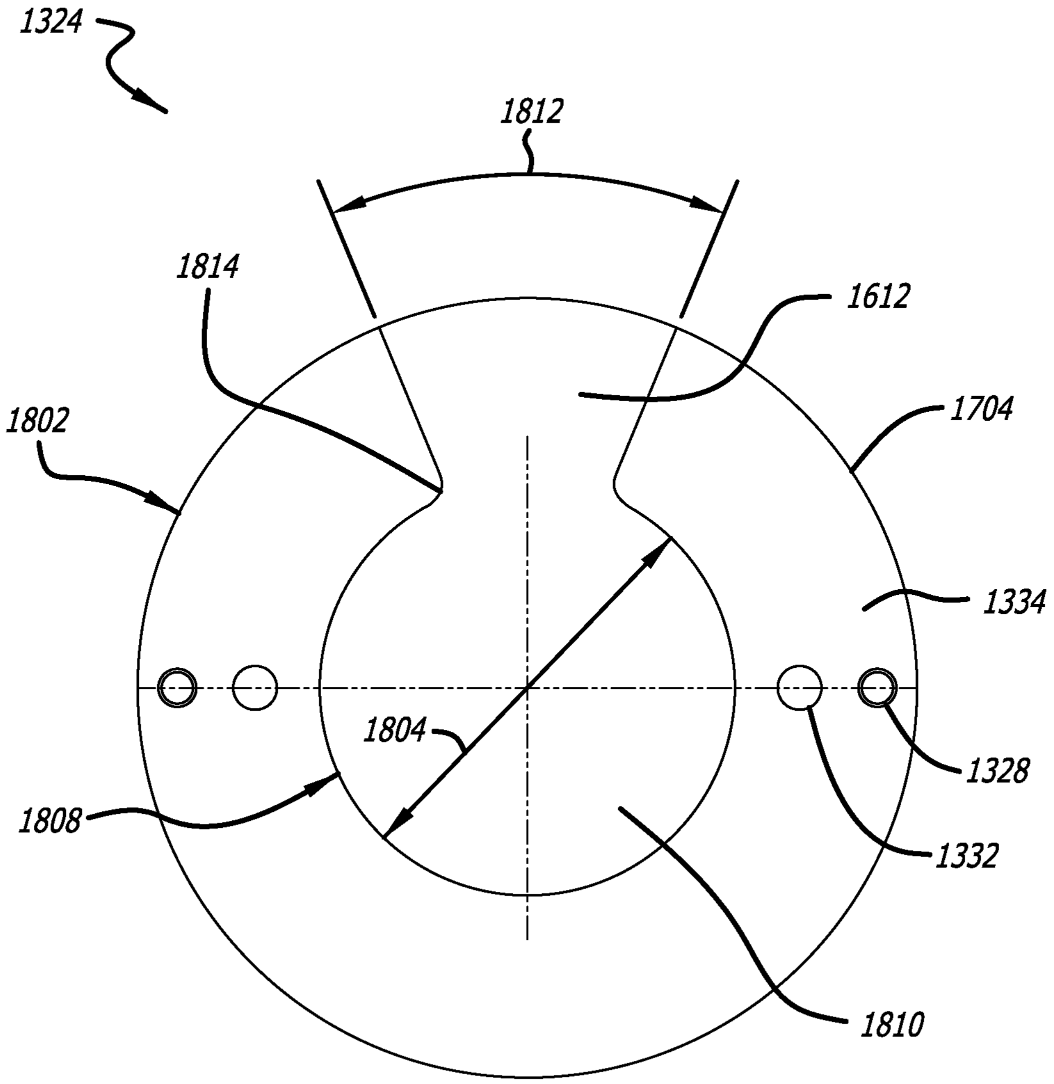
FIG. 18 shows a diagram of a bottom view of the driver plate of the second recessed lighting fixture of FIG. 13, according to an example embodiment of the present disclosure.

FIG. 18 shows a bottom view of the driver plate 1324 of the second recessed lighting fixture 1300 of FIG. 13. The example driver plate 1324 includes an outer ring 1802 that extends axially from the top surface 1330 to the bottom surface 1334 of the driver plate 1324. The example outer ring 1802 has an outer diameter coincident with the outer diameter 1704 of the driver plate 1324 and an inner diameter 1804 less than the outer diameter 1704. In some embodiments, the inner diameter may be from 10 to 50 mm, for example, 10 to 30 mm, 30 to 50 mm. In a preferred embodiment, the inner diameter is approximately 32 mm. Both the second apertures 1328 and the third apertures 1332 are positioned on the outer ring 1802 and extend through the thickness of the outer ring 1802.

In a center portion 1808 of the driver plate 1324, the driver plate 1324 extends only from the top surface 1330 to a recessed surface 1810. Additionally, in the notched region 1612, the driver plate 1324 extends only from the top surface 1330 to the recessed surface 1810. Thus, the driver plate 1324 includes an upper disc portion extending from the top surface 1330 to the recessed surface 1810 having a substantially solid circular cross section and a lower ring portion including the portion of the outer ring 1802 which extends from the recessed surface 1810 to the bottom surface 1334 of the driver plate 1324. On the recessed surface 1810 of the driver plate 1324, the notched region 1612 and the center portion 1808 form a continuous surface. The example notched region 1612 has an arc measure 1812 which is configured to allow one or more wire harnesses to be fed through the notched region 1612. In some embodiments, the arc measure 1812 is between 30 and 90 degrees. In a preferred embodiment, the arc measure 1812 is approximately 45 degrees. A corner 1814 of the outer ring 1802 from the notched region 1612 to the center portion 1808 may have a radius such as from 0 to 8 mm, or, preferably, approximately 2 mm.

Figure 19A:
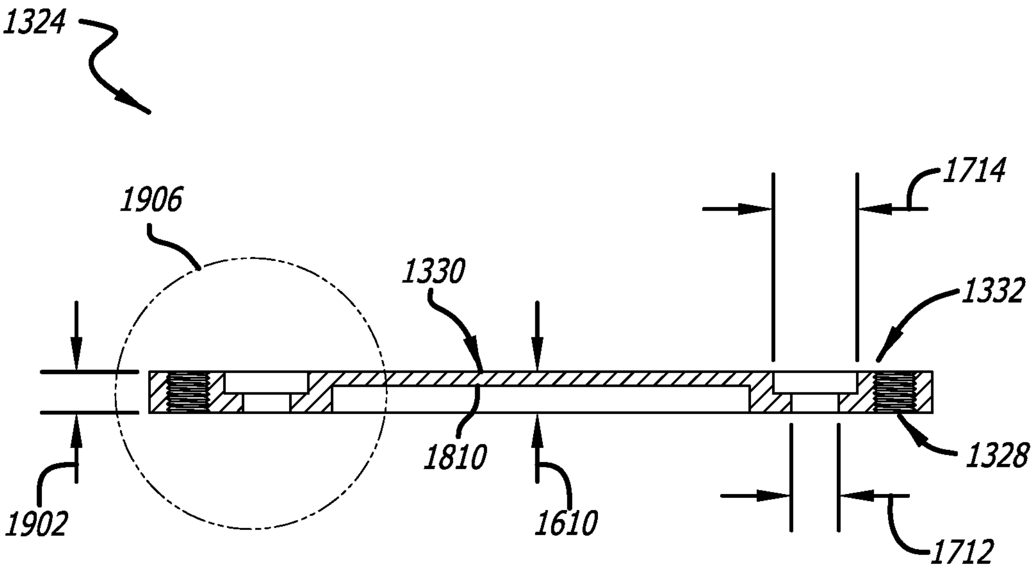
FIG. 19A shows a diagram of a cross-sectional side view of the driver plate of the second recessed lighting fixture of FIG. 13, according to an example embodiment of the present disclosure.

FIG. 19A shows a diagram of a cross-sectional side view of the driver plate 1324 through the cross-section C-C of FIG. 17A. An overall height 1902 of the driver plate 1324 extends from the top surface 1330 to the bottom surface 1334. FIG. 19A illustrates the distance 1610 from the recessed surface 1810 to the bottom surface 1334 of the driver plate 1324. As can be seen in FIG. 19A, the second apertures 1328 and the center portion 1712 of the third apertures 1332 extend fully through the thickness of the overall height 1902 of the driver plate 1324. As described above, the outer portion 1714 of the third apertures 1332 extends through only a portion of the thickness of the driver plate 1324.

Figure 19B:
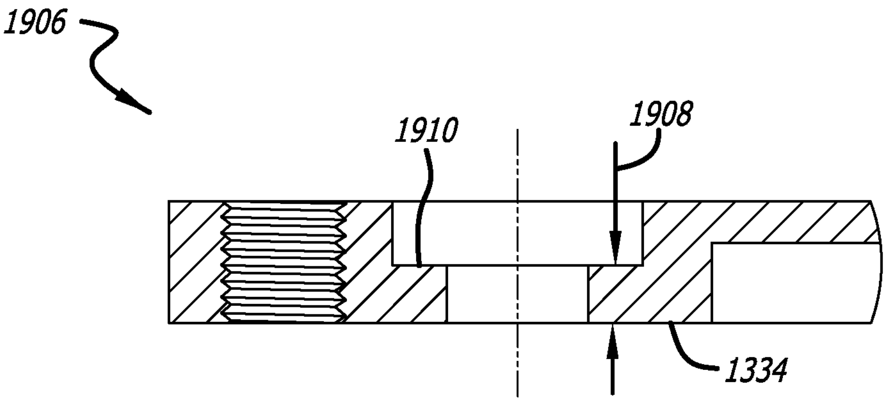
FIG. 19B shows a diagram of a detail view of the cross-sectional side view of FIG. 19A, according to an example embodiment of the present disclosure.

A detailed area 1906 of the cross-sectional view of the driver plate 1324 of FIG. 19A is illustrated in FIG. 19B. FIG. 19B shows a height 1908 from a bottom surface 1910 of the outer portion 1714 of the third aperture 1332 to the bottom surface 1334 of the driver plate 1324. The height 1908 is configured for sufficient strength to accommodate the coupling of the driver plate 1324 to the heat sink module 1326 via the second fasteners 1336. In some embodiments, the height 1908 is from, for example, 1 to 3 mm. In a preferred embodiment, the height 1908 is approximately 1.5 mm.

Figure 20:
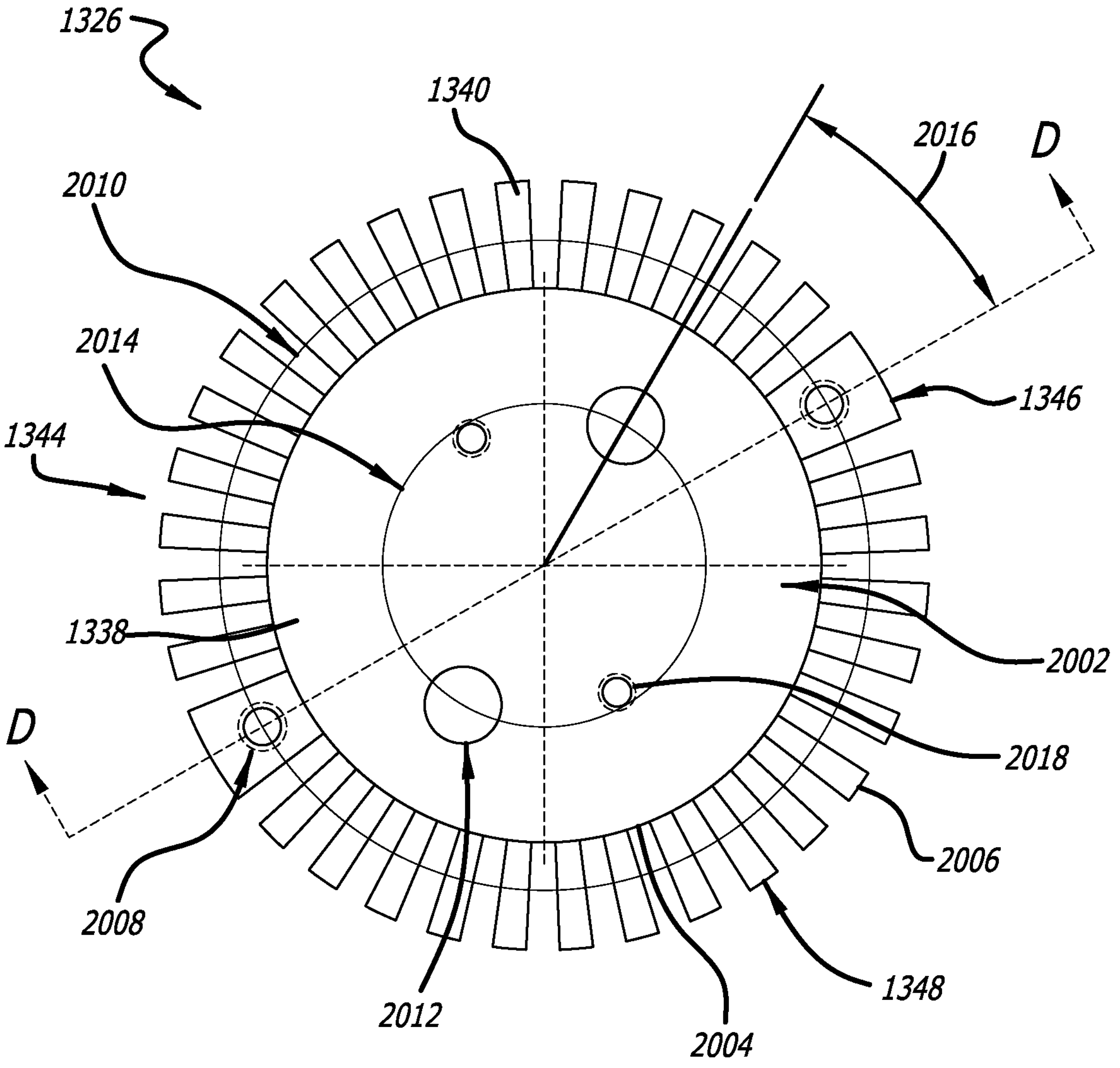
FIG. 20 shows a diagram of a top view of the heat sink module of the second recessed lighting fixture of FIG. 13, according to an example embodiment of the present disclosure.

FIG. 20 shows a diagram of a top view of the heat sink module 1326 of the second recessed lighting fixture 1300 of FIG. 13. The recessed surface 1338 can be seen in the top view of FIG. 20 which includes a top surface of a center portion 2002 of the heat sink module 1326 and a top surface of the notched portion 1348. The top surface 1340 of the heat sink module 1326 includes a top surface of the remainder of the fins 1344 and a top surface of the wide fins 1346. The fins 1344 and the wide fins 1346 extend radially outward from an outer diameter 2004 of the center portion 2002 to an outer diameter 2006 of the heat sink module 1326. In some embodiments, the outer diameter 2006 of the heat sink module 1326 is between, for example, 30 and 80 mm. In a preferred embodiment, the outer diameter 2006 of the heat sink module 1326 is approximately 50 mm.

The example heat sink module 1326 includes fourth apertures 2008 which extend downward from the top surface 1340 and are located on a circle having a diameter 2010 which is co-centric with the outer diameter 2006 of the heat sink module 1326. In some embodiments, the diameter 2010 including the fourth apertures 2008 is between, for example, 20 and 70 mm. In a preferred embodiment, the diameter 2010 is approximately 42 mm.

Circumferentially, the fourth apertures 2008 are centered on the tops of the wide fins 1346. Thus, the larger surface area of the top of the wide fins 1346 relative to the rest of the plurality of fins 1344 is suitable to accommodate the size of the fourth apertures 2008. The fourth apertures 2008 are configured to receive the second fasteners 1336 which couple the driver plate 1324 to the heat sink module 1326. As shown in FIG. 20, the fourth apertures 2008 may be threaded. As such, the second fasteners 1336 may be fed through the (threaded or unthreaded) third apertures 1332 of the driver plate 1324 and threaded into the fourth apertures 2008 in order to mechanically couple the driver plate 1324 and the heat sink module 1326. In some embodiments, the internal threading on the fourth apertures 2008 may accommodate a machine screw such as an M3×0.5 metric bolt or a #6-32 standard bolt.

The example heat sink module further includes fifth apertures 2012 which extend downward from the recessed surface 1338 and are located on a circle having a diameter 2014 which is co-centric with the outer diameter 2004 of the center portion 2002. In some embodiments, the diameter 2014 including the fifth apertures 2012 is between, for example, 10 and 50 mm. In a preferred embodiment, the diameter 2014 is approximately 21 mm. Further, the fifth apertures 2012 may be radially spaced at an angle 2016 from the fourth apertures 2008. In some embodiments, the angle 2016 may be approximately 30 degrees. In other embodiments, the angle 2016 may be from 0 to 90 degrees. The example fifth apertures 2012 may extend fully through the height of the heat sink module 1326 to allow for passage of one or more wire harnesses to pass through the fifth apertures 2012. Accordingly, the fifth apertures 2012 may be sized to accommodate such wire harnesses. In some embodiments, the fifth apertures 2012 may be from 2 to 10 mm in diameter, for example, 5 mm. In the example of FIG. 20, the heat sink module includes 2 of the fifth apertures 2012. In other embodiments, the heat sink module 1326 may include less (e.g., one) or more (e.g., three, four, five, six, etc.) fifth apertures 2012.

Additionally, the example heat sink module 1326 of FIG. 20 includes sixth apertures 2018 which extend downward from the recessed surface 1338 and are located on a circle that is co-centric with the outer diameter 2004 of the center portion 2002. The example sixth apertures 2018 may extend fully through the height of the heat sink module 1326. In some embodiments, the sixth apertures 2018 are fully threaded. The example sixth apertures 2018 may be configured to receive the third fasteners 1364 to couple the LED module holder 1360 to the heat sink module 1326.

Figure 21:
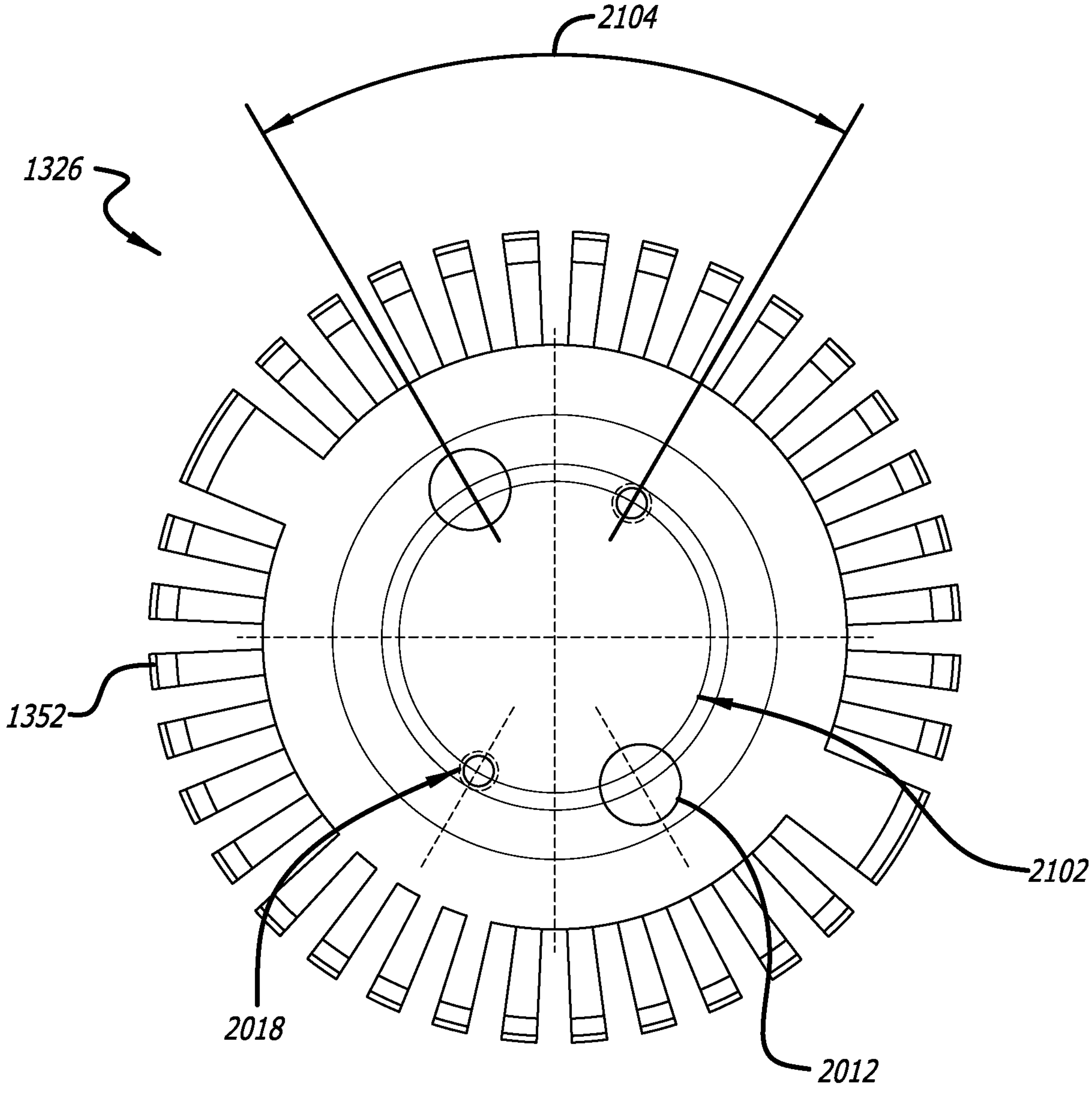
FIG. 21 shows a diagram of a bottom view of the heat sink module of the second recessed lighting fixture of FIG. 13, according to an example embodiment of the present disclosure.

FIG. 21 shows a diagram of a bottom view of the heat sink module 1326 of the second recessed lighting fixture 1300 of FIG. 13. The bottom view illustrates a diameter 2102 of the circle on which the sixth apertures 2018 are located. In some embodiments, the diameter 2102 including the sixth apertures 2018 is between, for example, 10 and 50 mm. In a preferred embodiment, the diameter 2102 is approximately 19 mm. Further, FIG. 21 illustrates that the sixth apertures 2018 are radially spaced at an angle 2104 from the fifth apertures 2012. In some embodiments, the angle 2104 may be approximately 60 degrees. In some embodiments, the angle 2104 may be from 0 to 90 degrees. Lastly, the external threads of the lower portion 1352 may be seen in the bottom view of FIG. 21.

Figure 22:
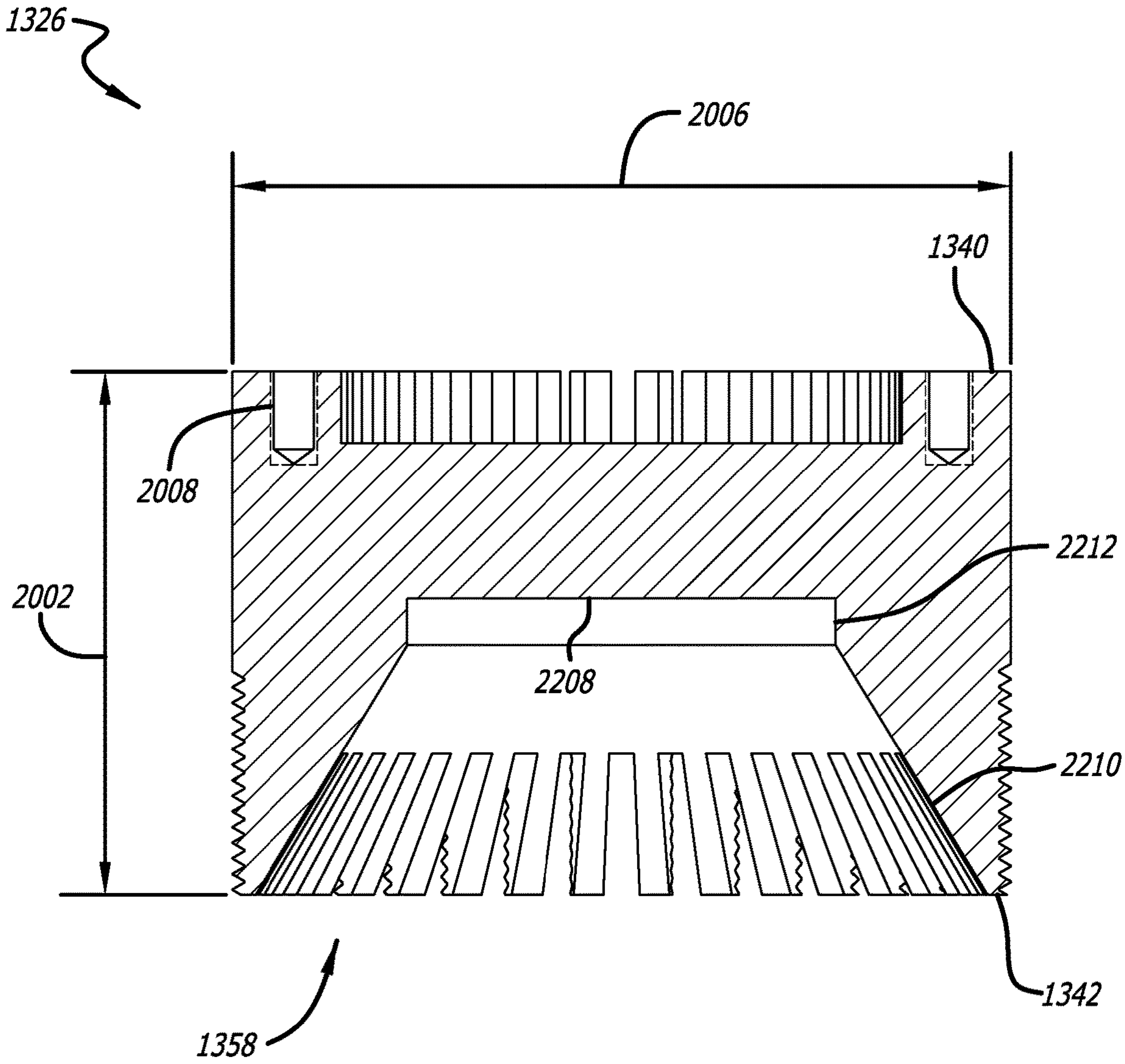
FIG. 22 shows a diagram of a cross-sectional side view of the heat sink module of the second recessed lighting fixture of FIG. 13, according to an example embodiment of the present disclosure.

FIG. 22 shows a diagram of a cross-sectional side view of the heat sink module 1326 through the cross-section D-D of FIG. 20. The example heat sink module 1326 has an overall diameter 2006 and an overall height 2202 which extends from the top surface 1340 to the bottom surface 1342. In some embodiments, the overall height 2202 of the heat sink module 1326 is between, for example, 20 and 80 mm. In a preferred embodiment, the overall height 2202 is approximately 34 mm. The fourth apertures 2008 can be seen which extend down from the top surface 1340. In the example heat sink module 1326, the fourth apertures do not extend fully through the height 2202, but have a depth which can accommodate the second fasteners 1336.

The heat sink module 1326 further includes the conical cavity 1358 configured to accommodate the LED module 1312, the LED module holder 1360, and the reflector 1362. The conical cavity 1358 extends from the bottom surface 1342 to a top cavity surface 2208. The cavity 1358 may have any shape suitable to accommodate the LED module 1312, the LED module holder 1360, and the reflector 1362 and suitable for coupling the LED module 1312 and the LED module holder 1360 to the heat sink module 1326. In the example of FIG. 22, the example cavity 1358 includes a lower conical portion 2210 and an upper cylindrical portion 2212. The lower conical portion 2210 may be configured to accommodate a shape of the reflector 1362. As shown in the perspective cross-sectional view of FIG. 23, the upper cylindrical portion 2212 may be configured to provide space for the LED module holder 1360 between the reflector 1362 and the interior surface of the cavity 1358.

Figure 23:
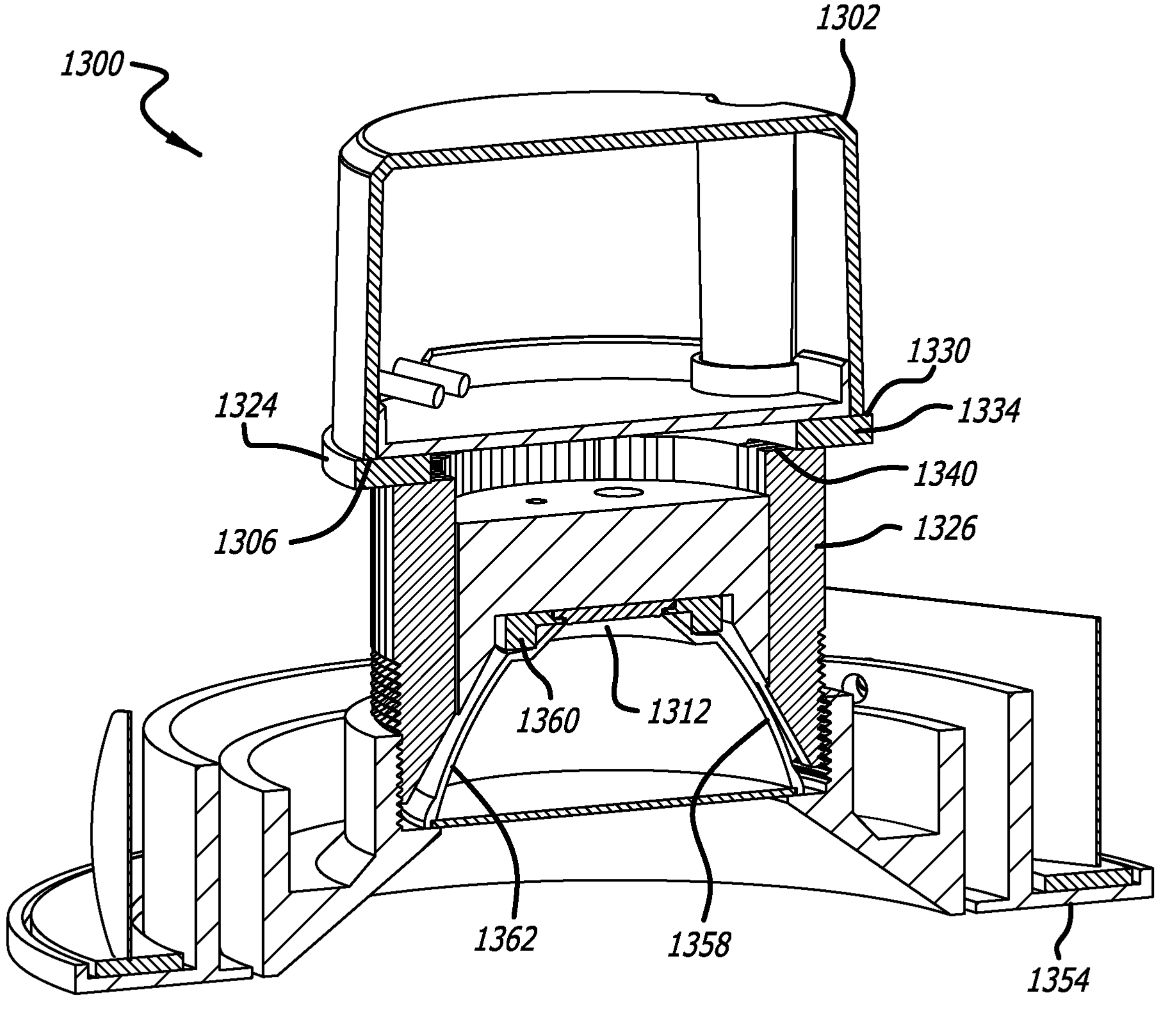
FIG. 23 shows a diagram of a perspective cross-sectional side view of the recessed lighting fixture of FIG. 13 in an assembled configuration, according to an example embodiment of the present disclosure.

FIG. 23 shows a diagram of a perspective cross-sectional side view of the second recessed lighting fixture 1300 of FIG. 13 in an assembled configuration. In FIG. 23, the driver housing 1302 is assembled to the driver plate 1324 via the first fasteners 1318 (not pictured) and the driver plate 1324 is further assembled to the heat sink module 1326 via the second fasteners 1336 (not pictured). The trim piece 1354 is shown threaded onto the external threads of the heat sink module 1326. Additionally, the LED module 1312, the LED module holder 1360, and the reflector 1362 are shown situated in the cavity 1358 of the heat sink module 1326.

To assemble the second recessed lighting fixture 1300, the thermal paste 1102 may be applied to the LED module 1312 and the LED module 1312 may be placed on the top cavity surface 2208 of the heat sink module 1326. The LED module holder 1360 may then be installed in the cavity 1358 of the heat sink module 1326 using the third fasteners 1364, thereby fixing the position of the LED module 1312 with respect to the heat sink module 1326. Before or after installation of the LED module 1312 in the cavity 1358, one or more wire harnesses may be fed through the fifth apertures 2012 in the center portion 2002 of the heat sink module 1326 and out of the notched portion 1348.

The driver plate 1324 may then be installed on the heat sink module 1326 by insertion of the second fasteners 1336 through the third apertures 1332 of the driver plate 1324 and the fourth apertures 2008 of the heat sink module 1326. As shown in FIG. 23, when the driver plate 1324 is assembled with the heat sink module 1326, the bottom surface 1334 of the driver plate 1324 mates with the top surface 1340 of the heat sink module 1326.

The driver plate 1324 may then be assembled with the driver housing 1302 by insertion of the first fasteners 1318 through the first apertures 1316 of the driver housing 1302 and into the second apertures 1328 of the driver plate 1324. When assembled, the top surface 1330 of the driver plate 1324 mates with the bottom surface 1306 of the driver housing 1302. Before or after installation of the driver plate 1324 to the driver housing 1302, one or more wire harnesses may be fed through the one or more openings 1322 in the walls 1308 of the driver housing 1302. In some embodiments, the driver plate 1324 is first installed on the driver housing 1302 and then assembled with the heat sink module 1326. To complete assembly of the second recessed lighting fixture 1300, the reflector 1362 may be installed in the cavity 1358 of the heat sink module 1326 with respective pins 1370 aligned with the two or more apertures 1372 in the LED module holder 1360. The trim piece 1354 may then be threaded onto the external threads of the heat sink module 1326, fixing the axial position of the reflector 1362 and completing assembly of the second recessed lighting fixture 1300.

Driver Housing Embodiments

FIGS. 24A to 24B illustrate an example driver housing according to the first embodiment of the recessed lighting fixture 100. FIG. 24A shows a top perspective view of the driver housing 102 while FIG. 24B shows a bottom perspective view of the driver housing 102. In FIG. 24B, internal electrical components 2400 are secured within the driver housing 102 and encapsulated with potting material.

FIGS. 25A to 25B illustrate an example driver housing according to the second embodiment of the recessed lighting fixture 1300. FIG. 25A shows a top perspective view of the driver housing 1302 including the wiring assembly 1314 while FIG. 25B shows a bottom perspective view of the driver housing 1302. In FIG. 25B, internal electrical components 2500 are secured within the driver housing 102 and encapsulated with potting material.

CONCLUSION

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recessed lighting fixture apparatus comprising:

an LED module configured to emit light;

a reflector configured to reflect at least a portion of the light emitted by the LED module;

a driver housing including a hollow cavity configured to receive a driver and two or more first apertures configured to receive first fasteners for coupling the driver housing;

a driver plate including a top surface including two or more second apertures configured to receive the first fasteners for coupling the driver plate to the driver housing, and a bottom surface including two or more third apertures configured to receive second fasteners for coupling the driver plate; and a heat sink module including two or more fourth apertures configured to receive the second fasteners for coupling the heat sink module to the driver plate, a cavity extending from a lower surface of the heat sink module, the cavity configured to receive the LED module, an LED module holder, and the reflector, and a lower portion including external threads for coupling with a trim piece, wherein the LED module holder is configured to maintain a relative position of the heat sink module and the LED module.

2. The recessed lighting fixture apparatus of claim 1, wherein the top surface of the driver plate is configured to mate with a bottom surface of the driver housing when the recessed lighting fixture apparatus is in an assembled configuration.

3. The recessed lighting fixture apparatus of claim 1, wherein the LED module is configured to mate with an inner top surface of the cavity of the heat sink module.

4. The recessed lighting fixture apparatus of claim 1, wherein the LED module holder includes one or more fifth apertures configured to receive third fasteners for coupling with the cavity of the heat sink module.

5. The recessed lighting fixture apparatus of claim 4, wherein the cavity of the heat sink module includes one or more sixth apertures configured to receive the third fasteners for coupling the LED module holder to the heat sink module.

6. The recessed lighting fixture apparatus of claim 1, wherein the heat sink module further includes a notched area extending from a top surface of the heat sink module, the notched area configured to allow passage of one or more wires.

7. The recessed lighting fixture apparatus of claim 1, wherein the two or more second apertures include internal threads.

8. The recessed lighting fixture apparatus of claim 1, wherein the two or more fourth apertures include internal threads.

9. The recessed lighting fixture apparatus of claim 1, wherein the two or more fourth apertures extend from a top surface of the heat sink module.

10. The recessed lighting fixture apparatus of claim 9, wherein the bottom surface of the driver plate is configured to mate with the top surface of the heat sink module.

11. The recessed lighting fixture apparatus of claim 1, wherein the two or more fourth apertures extend from a recessed surface of the heat sink module.

12. The recessed lighting fixture apparatus of claim 11, wherein the bottom surface of the driver plate is configured to mate with the recessed surface of the heat sink module.

13. A driver plate of a recessed lighting fixture comprising:

an outer ring portion having an outer diameter and an inner diameter, the outer ring portion including two or more first apertures configured to receive first fasteners for coupling the driver plate to a driver housing of the recessed lighting fixture; and two or more protrusions extending inward from the inner diameter of the outer ring portion, an inner portion of each of the two or more protrusions including a second aperture configured to receive second fasteners for coupling the driver plate to a heat sink module of the recessed lighting fixture, a bottom surface of the two or more protrusions extending below a lower surface of the outer ring portion.

14. The driver plate of claim 13, wherein each of the two or more first apertures include internal threads.

15. The driver plate of claim 13, wherein each of the second apertures are unthreaded apertures.

16. The driver plate of claim 13, wherein the bottom surface of the two or more protrusions is configured to mate with a recessed surface of the heat sink module and the lower surface of the outer ring portion is configured to mate with a top surface of the heat sink module when the recessed lighting fixture is in an assembled configuration.

17. A driver plate of a recessed lighting fixture comprising:

an upper disc portion having an outer diameter;

a lower ring portion extending from a lower surface of the upper disc portion, the lower ring portion extending radially inward from at least a portion of the outer diameter to an inner diameter;

two or more first apertures extending through the upper disc portion and the lower ring portion, the two or more first apertures configured to receive first fasteners for coupling the driver plate to a driver housing of the recessed lighting fixture; and two or more second apertures extending through the upper disc portion and the lower ring portion, the two or more second apertures configured to receive second fasteners for coupling the driver plate to a heat sink module of the recessed lighting fixture, a bottom surface of the lower ring portion configured to mate with a top surface of the heat sink module when the recessed lighting fixture is in an assembled configuration.

18. The driver plate of claim 17, wherein each of the two or more first apertures include internal threads.

19. The driver plate of claim 17, wherein each of the two or more second apertures are unthreaded apertures.

20. The driver plate of claim 17, wherein each of the two or more second apertures are counterbored apertures.

* * * * *